United States Patent
Higashino

(10) Patent No.: US 9,892,754 B2
(45) Date of Patent: Feb. 13, 2018

(54) DATA DETECTION DEVICE, PLAYBACK DEVICE, AND DATA DETECTION METHOD

(71) Applicant: SONY CORPORATION, Tokyo (JP)

(72) Inventor: Satoru Higashino, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/531,984

(22) PCT Filed: Dec. 9, 2015

(86) PCT No.: PCT/JP2015/084520
§ 371 (c)(1),
(2) Date: May 31, 2017

(87) PCT Pub. No.: WO2016/139863
PCT Pub. Date: Sep. 9, 2016

(65) Prior Publication Data
US 2017/0330593 A1    Nov. 16, 2017

(30) Foreign Application Priority Data

Mar. 4, 2015 (JP) ................................. 2015-042434

(51) Int. Cl.
*G11B 27/36* (2006.01)
*G11B 20/10* (2006.01)
(52) U.S. Cl.
CPC .. *G11B 20/10055* (2013.01); *G11B 20/10009* (2013.01); *G11B 20/10277* (2013.01)
(58) Field of Classification Search
CPC ....... G11B 7/005; G11B 7/0053; G11B 7/131; G11B 20/10009; G11B 20/10055; G11B 7/055

USPC ................... 369/124.12, 59.22, 59.21, 47.26
See application file for complete search history.

(56) References Cited

U.S. PATENT DOCUMENTS 9,099,157 B1 * 8/2015 Hwang ............ G11B 20/10388

FOREIGN PATENT DOCUMENTS

| JP | 2005-302130 | 10/2005 |
| JP | 2012-079385 | 4/2012 |
| JP | 2012-221513 | 11/2012 |
| JP | 2013-149306 | 8/2013 |
| JP | 2013-200921 | 10/2013 |
| JP | 2014-053054 | 3/2014 |

* cited by examiner

*Primary Examiner* — Nabil Hindi
(74) *Attorney, Agent, or Firm* — Paratus Law Group, PLLC

(57) ABSTRACT

Data detection capability is improved by whitening crosstalk noise from an equalization signal and detecting binary data. Each of a plurality of detection signals is input to one of a plurality of adaptive equalizers, and outputs of the plurality of adaptive equalizers are computed to obtain an equalization signal for returning light at the time of shining of light onto bounds including a target track subject to data detection and adjacent tracks of an optical recording medium having a plurality of tracks formed thereon. Crosstalk noise from the adjacent tracks included in the equalization signal obtained by this multi-input adaptive equalization process is whitened first, followed by a binarization process. Also, an equalization error is found, and supplied as a control signal for adaptive equalization. Further, a whitening factor updating process is also performed to adaptively update a filter factor of a whitening filter.

7 Claims, 11 Drawing Sheets

FIG. 2
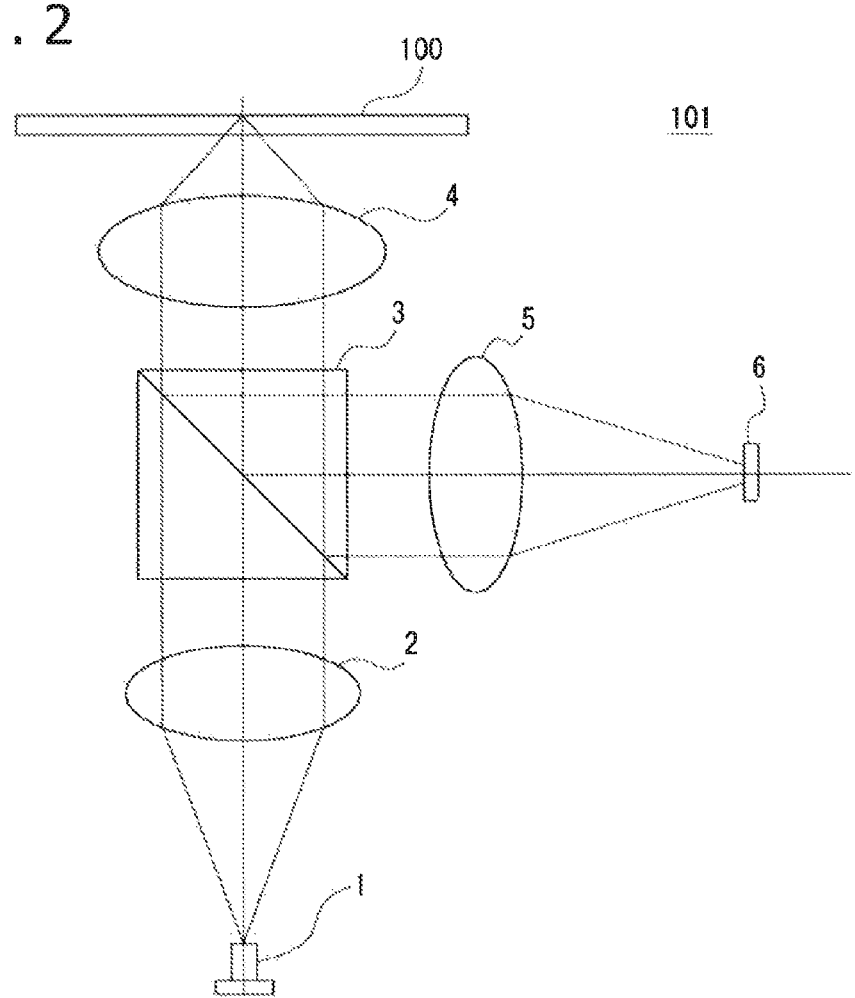
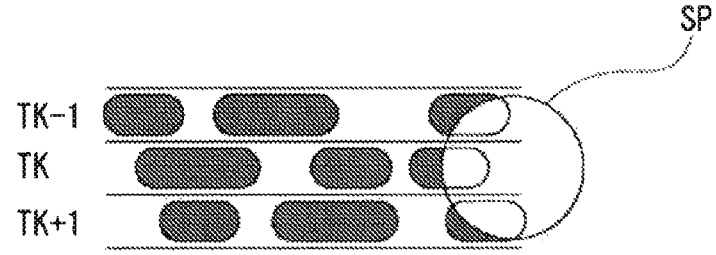
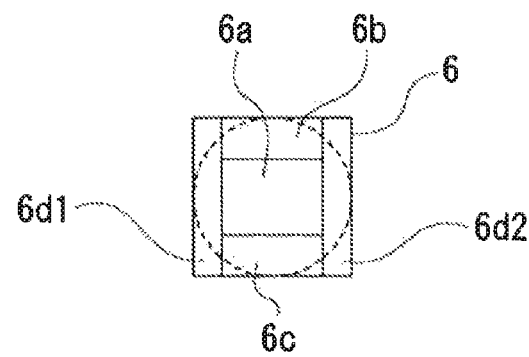

FIG.6
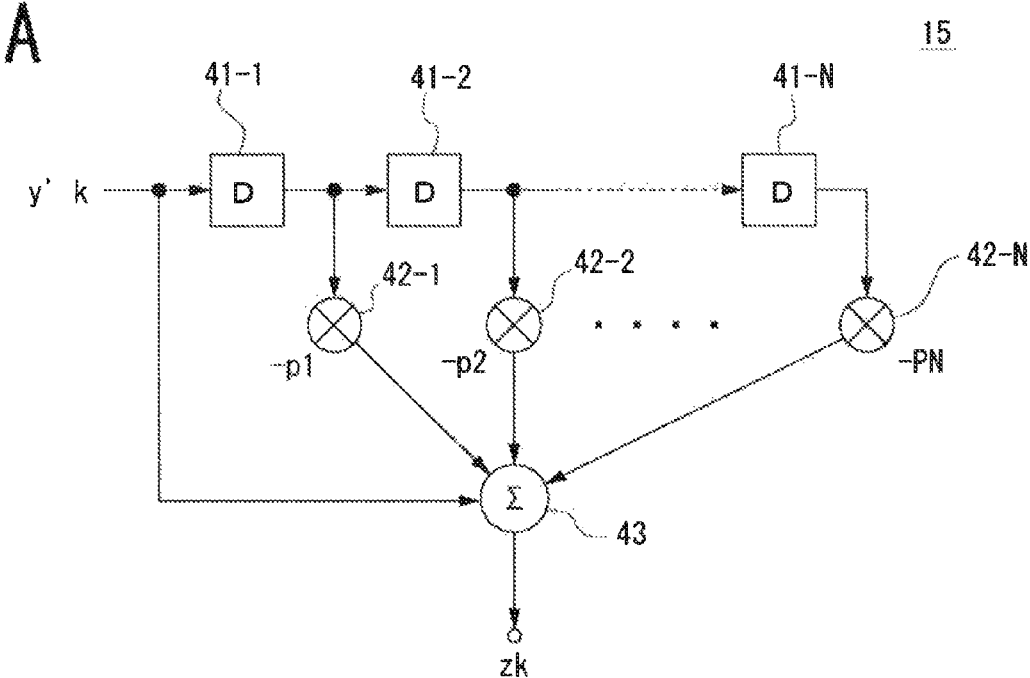
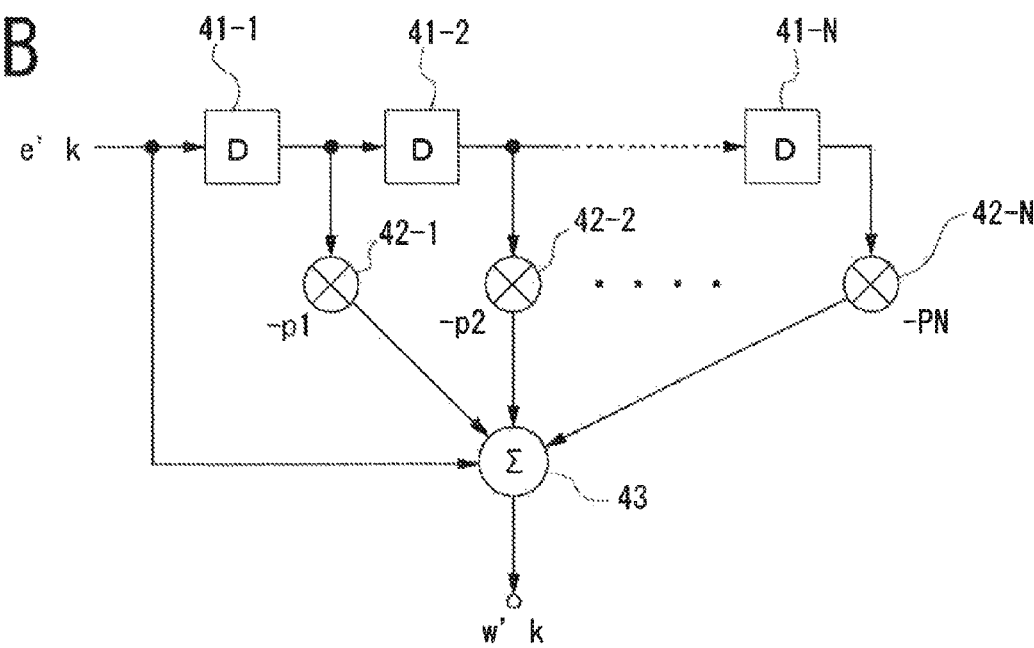

FIG. 8
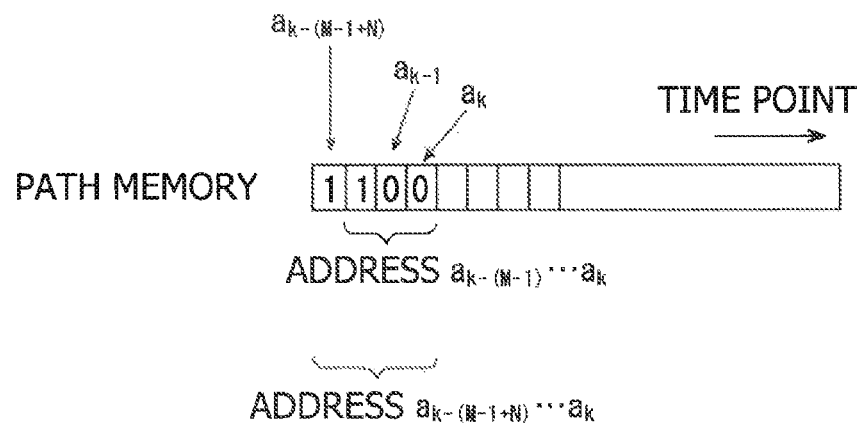
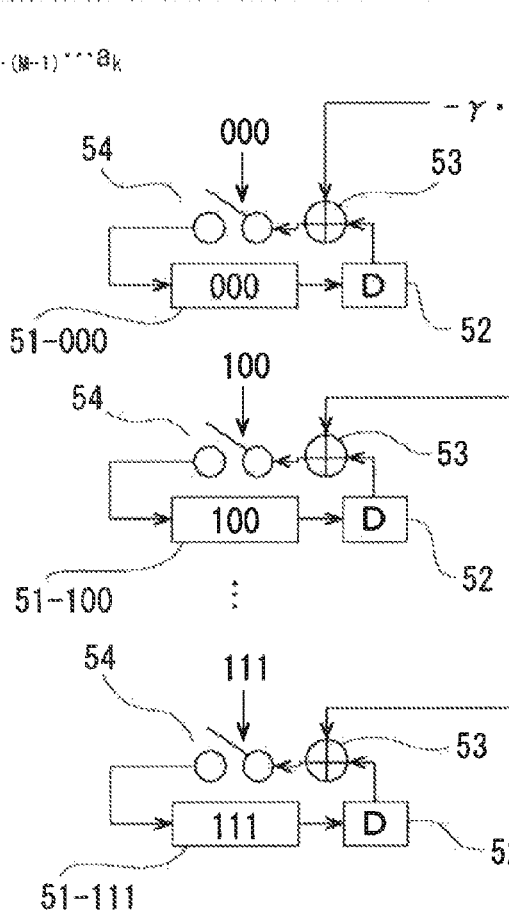

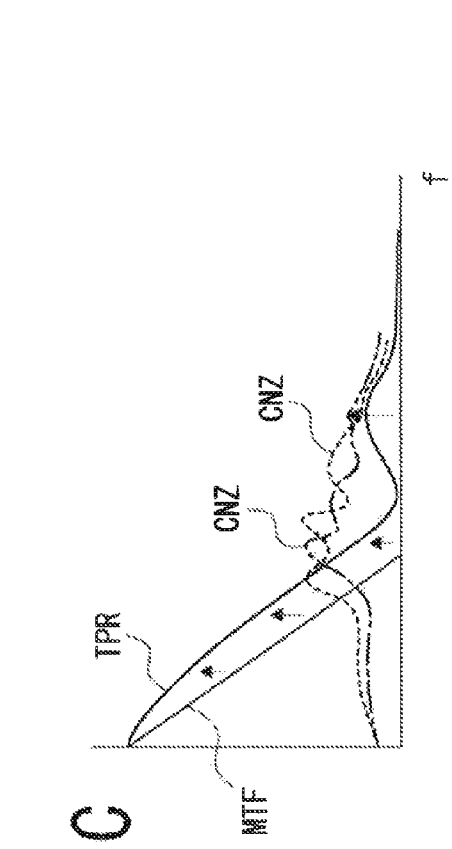
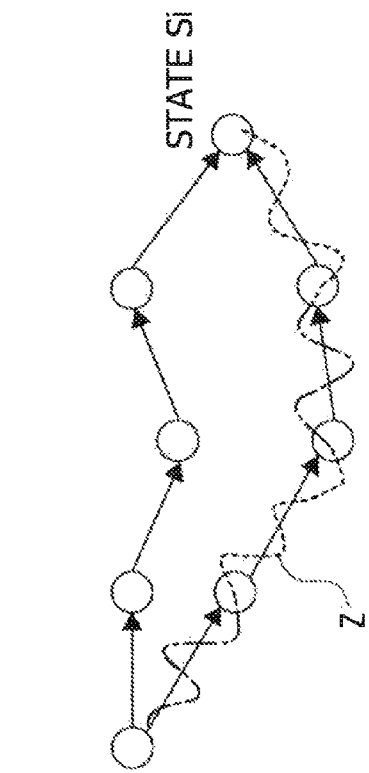
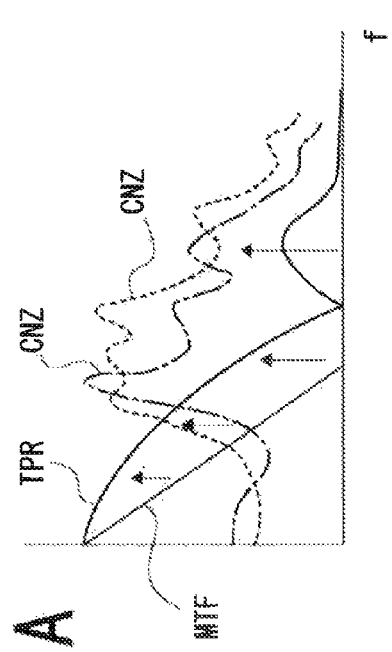
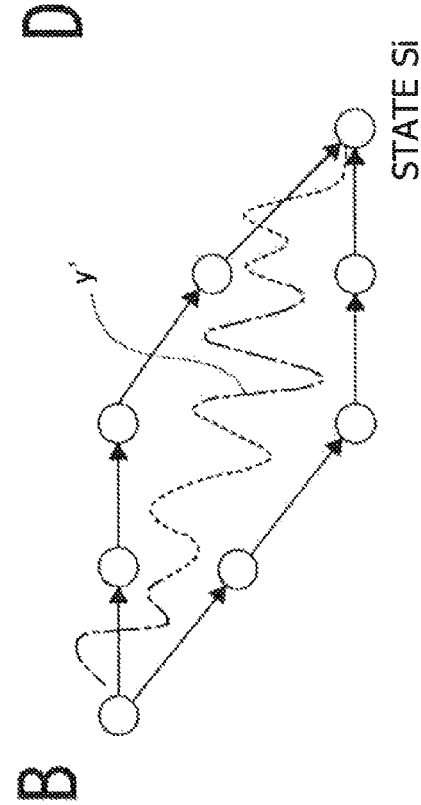
FIG. 10

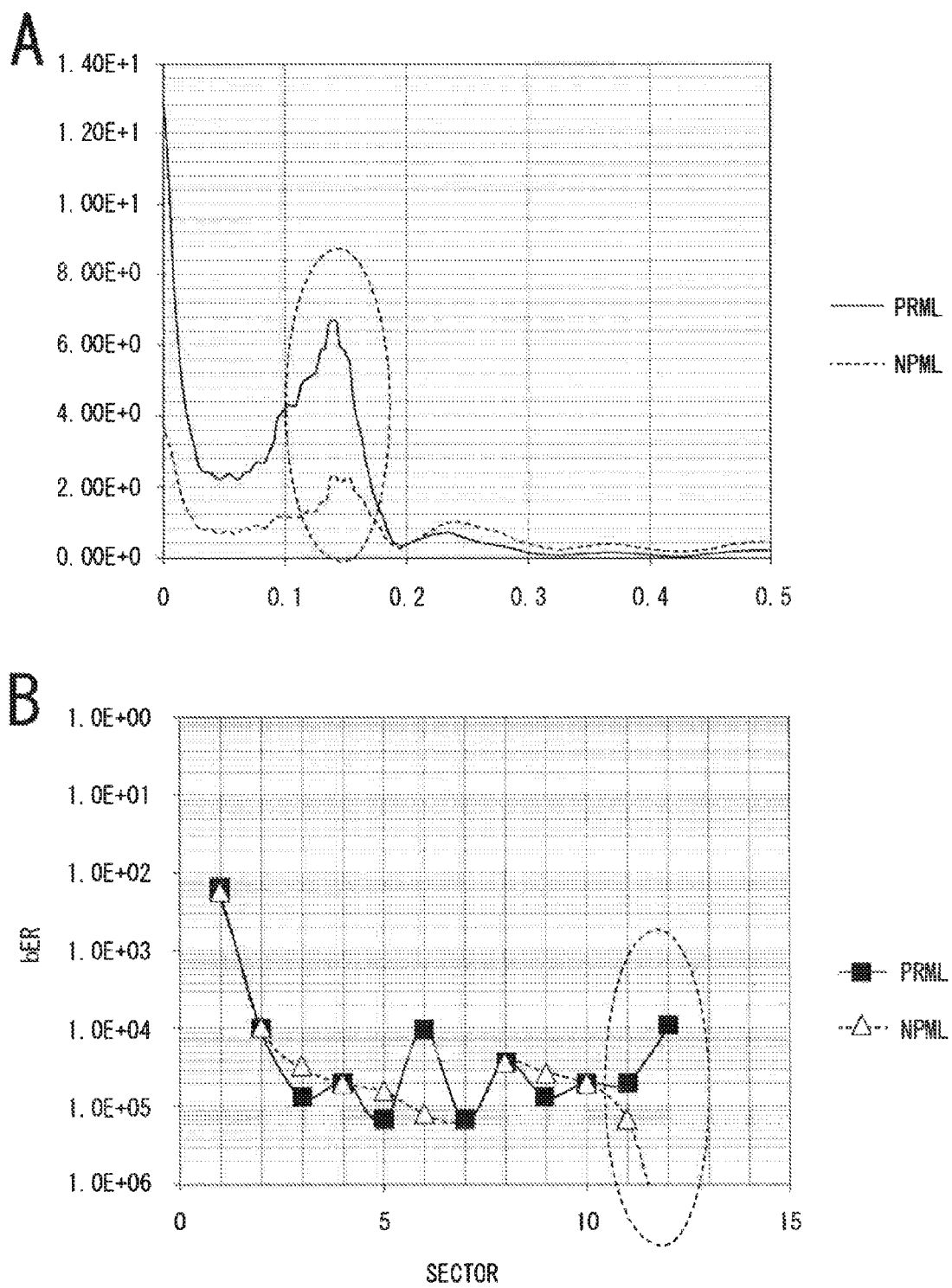

DATA DETECTION DEVICE, PLAYBACK DEVICE, AND DATA DETECTION METHOD

CROSS REFERENCE TO PRIOR APPLICATION

This application is a National Stage Patent Application of PCT International Patent Application No. PCT/JP2015/084520 (filed on Dec. 9, 2015) under 35 U.S.C. § 371, which claims priority to Japanese Patent Application No. 2015-042434 (filed on Mar. 4, 2015), which are all hereby incorporated by reference in their entirety.

TECHNICAL FIELD

The present technology relates to a data detection device, a playback device, and a data detection method, and particularly, to a decoding technology of an equalization signal subjected to crosstalk cancellation and partial response equalization.

CITATION LIST

Patent Literatures

[PTL 1]
JP 2005-302130 A
[PTL 2]
JP 2012-79385 A

BACKGROUND ART

In the case of partial response (PR) equalization of a playback signal from an optical disc and so on as described in PTL 1, noise is also emphasized. NPML (Noise Predictive Maximum Likelihood) is known to improve detection capability by whitening emphasized noise.

Also, if a track pitch is narrowed to increase optical disc density, crosstalk from adjacent tracks will increase. For example, PTL 2 describes a crosstalk canceller that supplies respective playback signals of a target track to be played and tracks on both sides thereof to an adaptive equalizer so as to control a tap factor of the adaptive equalizer.

SUMMARY

Technical Problem

In the case of a crosstalk canceller as described in PTL 2, three beams are required to read the target track to be played and the tracks on both sides thereof at the same time, and it is necessary to match phases of the playback signals to be read by the three beams. Alternatively, although it is possible for one beam to successively read the three tracks and synchronize the playback signals, a memory is required for the synchronization. Therefore, the one described in PTL 1 leads to a complicated configuration of an optical pickup, to complicated phase matching, or to a larger circuit scale.

In the present disclosure, handling multiple channels with a single beam is considered to simplify a system using a crosstalk canceller based on adaptive equalizers. Then, in this case, it is an object to avoid a situation in which noise components from adjacent tracks that are not successfully cancelled are enhanced due to PR equalization and binarization such as the PRML (Partial Response Maximum Likelihood) detection method is adversely affected so as to effectively make full use of binary data detection capability.

Solution to Problem

A data detection device according to the present technology includes a multi-input adaptive equalization section, a whitening filter, a binarization section, an equalization error computation section, and a whitening factor updating section. In the multi-input adaptive equalization section, each of a plurality of detection signals generated by using photoreceptor signals of a plurality of divided areas of an optical detection section is input to one of a plurality of adaptive equalizers, and outputs of the plurality of adaptive equalizers are computed and output as an equalization signal for returning light at the time of shining of light onto bounds including a target track subject to data detection and adjacent tracks of an optical recording medium having a plurality of tracks formed thereon. The whitening filter whitens crosstalk noise from the adjacent tracks included in the equalization signal output from the multi-input adaptive equalization section. The binarization section obtains binary data by performing a binarization process on the equalization signal that has passed through the whitening filter. The equalization error computation section finds an equalization error relative to an equalization target for the equalization signal output from the multi-input adaptive equalization section and supplies the equalization error to the plurality of adaptive equalizers as a control signal for adaptive equalization. The whitening factor updating section adaptively updates a filter factor of the whitening filter.

As a result, crosstalk noise included in the equalization signal obtained by the multi-input adaptive equalization section is whitened first, followed by processing by the binarization section. The filter factors of the adaptive equalizers and the whitening filter are adaptively updated.

In the data detection device according to the present technology described above, the whitening factor updating section possibly updates the filter factor of the whitening filter in such a manner as to minimize crosstalk noise energy using the equalization error obtained by the equalization error computation section. As a result, whitening of crosstalk noise is optimized.

In the data detection device according to the present technology described above, the multi-input adaptive equalization section possibly performs a partial response equalization process on each of the plurality of detection signals, and the binarization section possibly performs a maximum likelihood decoding process as a binarization process of the equalization signal, and the whitening factor updating section possibly updates the filter factor of the whitening filter in such a manner as to maximize a ratio between the crosstalk noise energy of the equalization signal and a minimum distance in the maximum likelihood decoding process.

As a result, the whitening filter process is optimized in response to maximum likelihood decoding.

In the data detection device according to the present technology described above, the binarization section possibly performs metric operations using the filter factor of the whitening filter set by the whitening factor updating section.

That is, the filter factor set for the whitening filter by the whitening factor updating section is used by the binarization section.

In the data detection device according to the present technology described above, it is preferable that the multi-input adaptive equalization section perform a partial response equalization process on each of the plurality of detection signals, and that the binarization section perform a maximum likelihood decoding process as a binarization process of the equalization signal, read, from a memory by using past judgment results as an address, a reference level calculated using the filter factor of the whitening filter and stored in the memory, and use the reference level as a reference level to be used for the metric operations of the maximum likelihood decoding process.

As a result, processing load of branch metric operations is reduced in the binarization section.

A playback device according to the present technology includes the multi-input adaptive equalization section, the whitening filter, the binarization section, the equalization error computation section, and the whitening factor updating section of the data detection device described above and also includes an optical detection section and a demodulation section. The optical detection section receives, with a plurality of divided areas, returning light at the time of shining of light onto bounds including a target track subject to data detection and adjacent tracks of an optical recording medium having a plurality of tracks formed thereon and generates a plurality of detection signals using photoreceptor signals of the plurality of divided areas. The demodulation section demodulates playback data from the binary data obtained by the binarization section. As a result, data playback is realized based on data detection with reduced impact of crosstalk noise.

A data detection method according to the present technology is a data detection method of a data detection device to which a plurality of detection signals generated by using photoreceptor signals of a plurality of divided areas of an optical detection section are input for returning light at the time of shining of light onto bounds including a target track subject to data detection and adjacent tracks of an optical recording medium having a plurality of tracks formed thereon. Then, the data detection method includes a multi-input adaptive equalization process, a whitening process, a binarization process, an equalization error computation process, and a whitening factor updating process. The multi-input adaptive equalization process obtains an equalization signal by inputting each of the plurality of detection signals to one of a plurality of adaptive equalizers and computing outputs of the plurality of adaptive equalizers. The whitening process whitens crosstalk noise from the adjacent tracks included in the equalization signal obtained by the multi-input adaptive equalization process. The binarization process detects binary data from the equalization signal subjected to the whitening process. The equalization error computation process finds an equalization error relative to an equalization target for the equalization signal obtained by the multi-input adaptive equalization process and supplies the equalization error to the plurality of adaptive equalizers as a control signal for adaptive equalization. The whitening factor updating process adaptively updates a filter factor of the whitening process.

That is, crosstalk noise included in the equalization signal obtained by the multi-input adaptive equalization process is whitened first, followed by a binarization process.

Advantageous Effects of Invention

According to the present technology, crosstalk noise included in an equalization signal obtained by a multi-input adaptive equalization process is whitened first, followed by a binarization process. As a result, binarization with enhanced crosstalk noise is avoided. Therefore, data detection capability can be improved. It should be noted that the effect described here is not necessarily limited and that the effect may be any one of those described in the present disclosure.

BRIEF DESCRIPTION OF DRAWINGS

FIG. 2 illustrates explanatory diagrams of an optical pickup of the playback device of the embodiment.

FIG. 6 illustrates block diagrams of a whitening filter of the embodiment.

FIG. 8 illustrates explanatory diagrams of $\Delta r$ learning of the embodiment.

FIG. 10 illustrates explanatory diagrams of crosstalk noise whitening of the embodiment.

FIG. 11 illustrates explanatory diagrams of effects of the embodiment.

DESCRIPTION OF EMBODIMENT

An embodiment will be described below in the following order.
<1. Configuration of Playback Device>
<2. Configuration and Operation of Data Detection Processing Section>
<3. Conclusion and Modification Example>

1. CONFIGURATION OF PLAYBACK DEVICE

Figure 1:
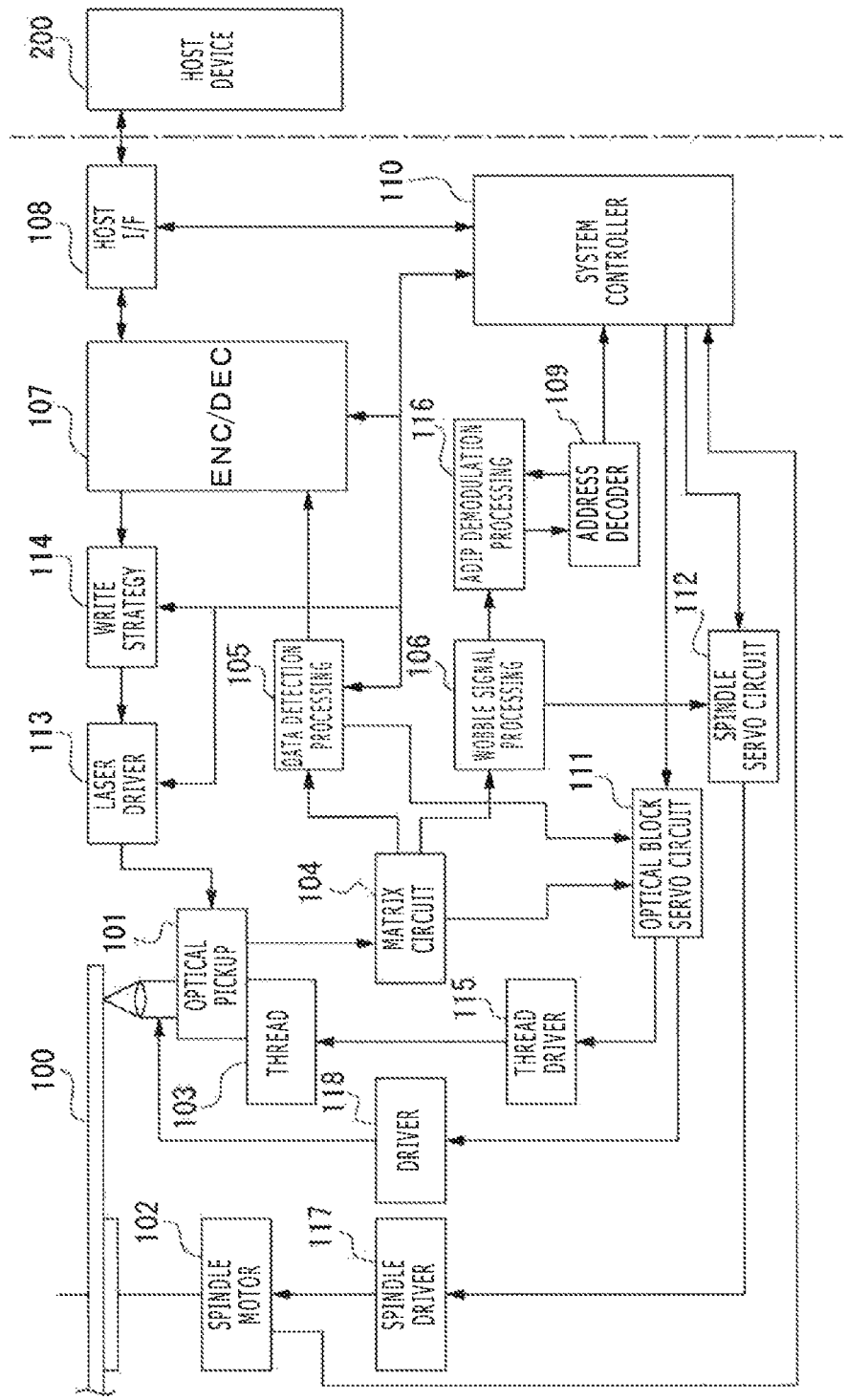
FIG. 1 is a block diagram of a playback device of an embodiment of the present technology.

FIG. 1 illustrates a configuration example of an optical disc playback device (hereinafter referred to as playback device) of the embodiment.

The playback device includes an optical pickup 101 and a spindle motor 102 as illustrated in FIG. 1. The optical pickup 101 records information onto or plays back information from an optical disc 100 serving as an optical recording medium. The spindle motor 102 rotates the optical disc 100. A thread (feed motor) 103 is provided to move the optical pickup 101 in the direction of diameter of the optical disc 100.

A high-density optical disc such as BD (Blu-ray Disc (registered trademark)) can be used as the optical disc 100. A BD is a high-density optical disc having an approximately 25 GB (Giga Byte) recording capacity on one layer on one side and an approximately 50 GB recording capacity on two layers on one side. In the BD standard, a light source wavelength is 405 nm, and a NA (Numerical Aperture) of an objective lens is large or 0.85 to provide a small beam spot. In the CD (Compact Disc) standard, the light source wavelength is 780 nm, the NA is 0.45, and a spot diameter is 2.11 µm. In the DVD (Digital Versatile Disc) standard, the light source wavelength is 650 nm, the NA is 0.6, and the spot diameter is 1.32 µm. In the BD standard, the spot diameter can be reduced to 0.58 µm.

Further, recent years have seen commercialization of BDXL (registered trademark) that offers a shorter channel bit length, i.e., mark length, than BD for higher density in the direction of linear density to realize a large capacity or 100 GB on three layers and 128 GB on four layers.

In addition thereto, an optical disc is desirable that adopts a method of recording data onto both land tracks and groove tracks (which will be referred to as a land/groove recording method as appropriate) to further increase the recording capacity. It should be noted that grooves will be referred to as grooves, and tracks formed by grooves will be referred to as groove tracks. Grooves are defined as portions onto which laser light is shined during manufacture of the optical disc, areas sandwiched between adjacent grooves will be referred to as lands, and tracks formed by lands will be referred to as land tracks. Further, a multi-layer optical disc having a plurality of information recording layers stacked thereon can further increase the recording capacity.

When the optical disc 100 capable of high-density recording is loaded in the playback device, the optical disc 100 is rotated and driven by the spindle motor 102 at a CLV (Constant Linear Velocity) or at a CAV (Constant Angular Velocity) at the times of recording and playback. During playback, mark information recorded on the tracks of the optical disc 100 by the optical pickup (optical head) 101 is read. During data recording onto the optical disc 100, user data is recorded by the optical pickup 101 onto the tracks of the optical disc 100 as a phase change mark or as a coloring agent change mark.

In the case of a recordable disc, recording marks based on phase change marks are recorded onto tracks formed by wobbling grooves. Phase change marks are recorded at a linear density of 0.12 μm/bit and at 0.08 μm/channel bit, for example, by the RLL (1,7) PP modulation method (RLL; Run Length Limited, PP: Parity preserve/Prohibit rmtr (repeated minimum transition runlength)) in the case of a 23.3 GB/layer BD. Similarly, phase change marks are recorded at 0.0745 μm/channel bit in the case of a 25 GB/layer BD, and phase change marks are recorded at 0.05826 μm/channel bit in the case of a 32 GB/layer BDXL, and phase change marks are recorded at 0.05587 μm/channel bit in the case of a 33.4 GB/layer BDXL, and recording is conducted at the density matching with the channel bit length to suit the disc type. Letting a channel clock period be denoted by "T," the mark length is from 2T to 8T. Although grooves are not formed in the case of a playback-only disc, data modulated similarly by the RLL (1,7) PP modulation method is recorded as embossed pit strings.

Disc physical information and so on is, for example, recorded in the inner peripheral area and the like of the optical disc 100 by embossed pits or wobbling grooves as playback-only management information. These pieces of information are also read by the optical pickup 101. Further, ADIP (Address in Pregroove) information embedded as groove track wobbling on the optical disc 100 is also read by the optical pickup 101.

The optical pickup 101 includes a laser diode, a photodetector, an objective lens, an optics, and so on. The laser diode serves as a laser light source. The photodetector is used to detect reflected light. The objective lens serves as an output end of laser light. The optics shines laser light onto a disc recording surface via the objective lens and guides the reflected laser light onto the photodetector. In the optical pickup 101, the objective lens is held in such a manner as to be able to move in a tracking direction and in a focusing direction by a biaxial mechanism. The whole optical pickup 101 is able to move in a radial direction of the disc by the thread 103. A drive current is supplied from a laser driver 113 to the laser diode of the optical pickup 101, causing the laser diode to produce a laser.

Reflected light from the optical disc 100 is detected by the photodetector. An electric signal that matches with the amount of light received is generated and supplied to a matrix circuit 104. The matrix circuit 104 includes current/voltage conversion circuits, matrix operation/amplifying circuits, and so on for output currents from a plurality of photoreceptor elements serving as photodetectors, generating necessary signals through a matrix operation process. Current/voltage conversion circuits may be formed inside the photodetector elements. For example, a playback information signal (RF (Radio Frequency) signal) that corresponds to played-back data, a focus error signal and a tracking error signal for servo control, and so on are generated. Further, a push-pull signal is generated as a signal relating to groove wobbling, i.e., a signal for detecting wobbling.

The playback information signal output from the matrix circuit 104 is supplied to a data detection processing section 105, and the focus error signal and the tracking error signal are supplied to an optical block servo circuit 111, and the push-pull signal is supplied to a wobble signal processing circuit 106.

The data detection processing section 105 performs a binarization process of the playback information signal. For example, the data detection processing section 105 performs an A/D (Analog to Digital) conversion process of an RF signal, a playback clock generation process using a PLL (Phase Locked Loop), a PR equalization process, Viterbi decoding (maximum likelihood decoding), and so on and obtains a binary data string through a partial response maximum likelihood decoding process (PRML detection method). The data detection processing section 105 supplies the binary data string as information read from the optical disc 100 to an encoding/decoding section 107 at the subsequent stage.

The encoding/decoding section 107 handles demodulation of played-back data during playback and modulation of recorded data during recording. That is, the encoding/decoding section 107 performs data demodulation, deinterleaving, ECC (error correction code) decoding, address decoding, and so on during playback and performs ECC encoding, interleaving, data modulation, and so on during recording.

During playback, the binary data string decoded by the data detection processing section 105 is supplied to the encoding/decoding section 107. The encoding/decoding section 107 obtains played-back data from the optical disc 100 by performing a demodulation process on the binary data string. That is, the encoding/decoding section 107 obtains played-back data from the optical disc 100 by performing a demodulation process on the data that was recorded on the optical disc 100 after run length limited code modulation such as RLL (1,7) PP modulation and by performing an ECC decoding process for error correction.

The data that has been decoded down to played-back data by the encoding/decoding section 107 is transferred to a host interface 108 and is transferred to a host device 200 based on an instruction from a system controller 110. The host device 200 is, for example, a computer device or an AV (Audio-Visual) system device.

During recording onto or playback from the optical disc 100, ADIP information is processed. That is, the push-pull signal output as the signal relating to groove wobbling from the matrix circuit 104 is converted into digital wobble data by the wobble signal processing circuit 106. A clock synchronous with the push-pull signal is generated by a PLL process. Wobble data is demodulated into a data stream making up an ADIP address by an ADIP demodulation processing section 116, and the data stream is supplied to an address decoder 109. The address decoder 109 decodes supplied data, obtains an address value, and supplies the address value to the system controller 110.

During recording, data to be recorded is transferred from the host device 200. That data to be recorded is supplied to the encoding/decoding section 107 via the host interface 108. The encoding/decoding section 107 performs error correction code addition (ECC encoding), interleaving, subcode addition, and other processes as encoding processes on data to be recorded. Data subjected to these processes is subjected to run length limited code modulation such as RLL (1,7) PP modulation.

Data to be recorded that has been processed by the encoding/decoding section 107 is supplied to a write strategy section 114. The write strategy section 114 adjusts a laser drive pulse waveform with respect to recording layer property, laser light spot shape, linear recording speed, and so on as a recording compensation process. Then, the write strategy section 114 outputs a laser drive pulse to the laser driver 113.

The laser driver 113 supplies a current to the laser diode of the optical pickup 101 for laser emission based on the laser drive pulse subjected to the recording compensation process. As a result, marks matching with the data are recorded onto the optical disc 100.

The optical block servo circuit 111 generates a variety of servo drive signals for focusing, tracking, and thread from a focus error signal and a tracking error signal supplied from the matrix circuit 104 and causes servo operation to be performed. That is, the optical block servo circuit 111 generates a focus drive signal and a tracking drive signal to match with a focus error signal and a tracking error signal and drives a focus coil and a tracking coil of the biaxial mechanism in the optical pickup 101 using a driver 118. As a result, a tracking servo loop and a focus servo loop are formed by the optical pickup 101, the matrix circuit 104, the optical block servo circuit 111, the driver 118, and the biaxial mechanism.

Further, the optical block servo circuit 111 causes track jump operation to be performed by turning off the tracking servo loop in accordance with a track jump instruction from the system controller 110 and by outputting a jump drive signal. Further, the optical block servo circuit 111 generates a thread drive signal based, for example, on a thread error signal obtained as a low-band component of a tracking error signal and on access execution control from the system controller 110, and drives the thread 103 using a thread driver 115.

A spindle servo circuit 112 performs control so that the spindle motor 102 is rotated at a CLV. The spindle servo circuit 112 generates a spindle error signal by obtaining a clock generated by a PLL for a wobble signal as current rotational speed information of the spindle motor 102 and by comparing the current rotational speed information against given CLV reference speed information. Further, during data playback, a playback clock generated by the PLL in the data detection processing section 105 serves as current rotational speed information of the spindle motor 102. Therefore, a spindle error signal is generated by comparing this current rotational speed information against given CLV reference speed information. Then, the spindle servo circuit 112 outputs a spindle drive signal generated to match with a spindle error signal and causes the spindle motor 102 to be rotated at a CLV by a spindle driver 117.

The spindle servo circuit 112 generates a spindle drive signal to match with a spindle kick/brake control signal from the system controller 110 and causes the spindle motor 102 to start, stop, accelerate, decelerate, and perform other operations.

Various operations of a servo system and a recording/playback system as described above are controlled by the system controller 110 formed by a microcomputer. The system controller 110 performs various processes to match with the command from the host device 200 supplied via the host interface 108. For example, when a write command is issued from the host device 200, the system controller 110 moves the optical pickup 101 to the address to be written to first. Then, the encoding/decoding section 107 is caused to encode the data (e.g., video data and audio data) transferred from the host device 200 as described above. Then, recording is conducted as a result of laser emission driven by the laser driver 113 to match with encoded data.

Further, for example, if a read command that requests transfer of certain data recorded on the optical disc 100 is supplied from the host device 200, the system controller 110 performs seek operation control targeted at the specified address first. That is, an instruction is issued to the optical block servo circuit 111, causing the optical pickup 101 to perform accessing operation targeted at the address specified by a seek command. Afterward, operation control is performed that is required to transfer the data during that specified data interval to the host device 200. That is, requested data is transferred by reading data from the optical disc 100 and causing the data detection processing section 105 and the encoding/decoding section 107 to perform playback processes.

It should be noted that although the playback device in the example of FIG. 1 was described as a playback device connected to the host device 200, the playback device may be not connected to other device. In that case, an operating section and a display section are provided, resulting in a different configuration of an interface portion that handles data inputs and outputs from the configuration shown in FIG. 1. That is, recording and playback are conducted in response to user operation, and a terminal section may be formed to input and output various kinds of data. Naturally, various other configuration examples of the playback device are also possible.

A description will be given next of the optical pickup 101 used for the playback device described above using FIG. 2A. The optical pickup 101 records information onto the optical disc 100 and plays back information from the optical disc 100 using, for example, laser light (beam) with a wavelength $\lambda$ of 405 nm. Laser light is emitted from a semiconductor laser (LD: Laser Diode) 1.

Laser light passes through a collimator lens 2, a polarizing beam splitter (PBS) 3, and an objective lens 4 and is shined onto the optical disc 100. The polarizing beam splitter 3 has a separation plane that transmits almost 100% of P-polarization and reflects almost 100% of S-polarization, for example. Reflected light from a recording layer of the optical disc 100 returns through the same optical path to enter the polarizing beam splitter 3. Incident laser light is almost fully reflected by the polarizing beam splitter 3 by interposing a λ/4 element that is not shown.

Laser light reflected by the polarizing beam splitter 3 is collected onto a photoreceptor surface of a photodetector 6 via a lens 5. The photodetector 6 has, on the photoreceptor surface, a photoreceptor cell that converts incident light into electricity. As an example, the photoreceptor cell is divided into five areas 6a, 6b, 6c, 6d1, and 6d2 by division lines that divide the cell into three parts in a tangential direction (track direction) and by division lines that divide the cell into three parts in a radial direction as illustrated in FIG. 2C.

Then, when a track TK of the optical disc 100 is a target track to be played back as illustrated in FIG. 2B, a spot SP of the laser light is controlled such that the spot SP is shined not only mainly onto the track TK but also onto an adjacent track TK−1 and an adjacent track TK+1. For this reason, playback information signal components of the track TK, the track TK−1, and the track TK+1 are included as information on returning light of laser light, and these are received by associated areas among the areas 6a, 6b, 6c, 6d1, and 6d2 of the photodetector 6. It should be noted that this example of area division is merely an example. Various area division examples are conceivable as the photodetector 6 according to the present embodiment regardless of such area division.

The photodetector 6 outputs five-channel electric signals to match with amounts of light received by the respective areas 6a, 6b, 6c, 6d3, and 6d2 of the photoreceptor cell. It should be noted that, as for the configuration of the optical pickup 101 in FIG. 2A, the minimum configuration elements for describing the present disclosure are shown. Signals for generating a focus error signal and a tracking error signal output to the optical block servo circuit 111 via the matrix circuit 104, a push-pull signal output to the wobble signal processing circuit 106 via the matrix circuit 104, and so on are not shown. In addition to the above, various configurations other than the configuration shown in FIG. 2A are possible.

Also, although a playback information signal that matches with each area is obtained by dividing a cross section of a luminous flux of returning light from the optical disc 100 into a plurality of areas as described above, a method other than those that divide the photodetector 6 into a required number may be used as a method to obtain a playback information signal for each area. For example, a method may be used that provides an optical path conversion element in the optical path from after the objective lens 4 to the photodetector 6 to separate the plurality of areas so as to supply a plurality of beams separated by the optical path conversion element to the different photodetectors. A diffraction element such as holographic optical element, a refraction element such as microlens array or microprism, and so on may be used as an optical path conversion element.

In any case, in the case of the present embodiment, by returning light of laser light shined onto the plurality of track TK, track TK−1, and track TK+1 as illustrated in FIG. 2B, playback information signals for a plurality of channels including playback information signal components of the adjacent tracks TK−1 and TK+1 are generated.

2. CONFIGURATION AND OPERATION OF DATA DETECTION PROCESSING SECTION

As described above, as a result of playback by the optical pickup 101 from the optical disc 100, detection signals S6a, S6b, S6c, S6d1, and S6d2 of the areas 6a, 6b, 6c, 6d1, and 6d2, respectively, are supplied to the matrix circuit 104 for use as playback information signals for the respective areas. In this example, we assume that a playback information signal Sa based on the detection signal S6a, a playback information signal Sb for the detection signal S6b, a playback information signal Sc for the detection signal S6c, and a playback information signal Sd obtained by adding the detection signals S6d1 and S6d2 are output from the matrix circuit 104.

Figure 3:
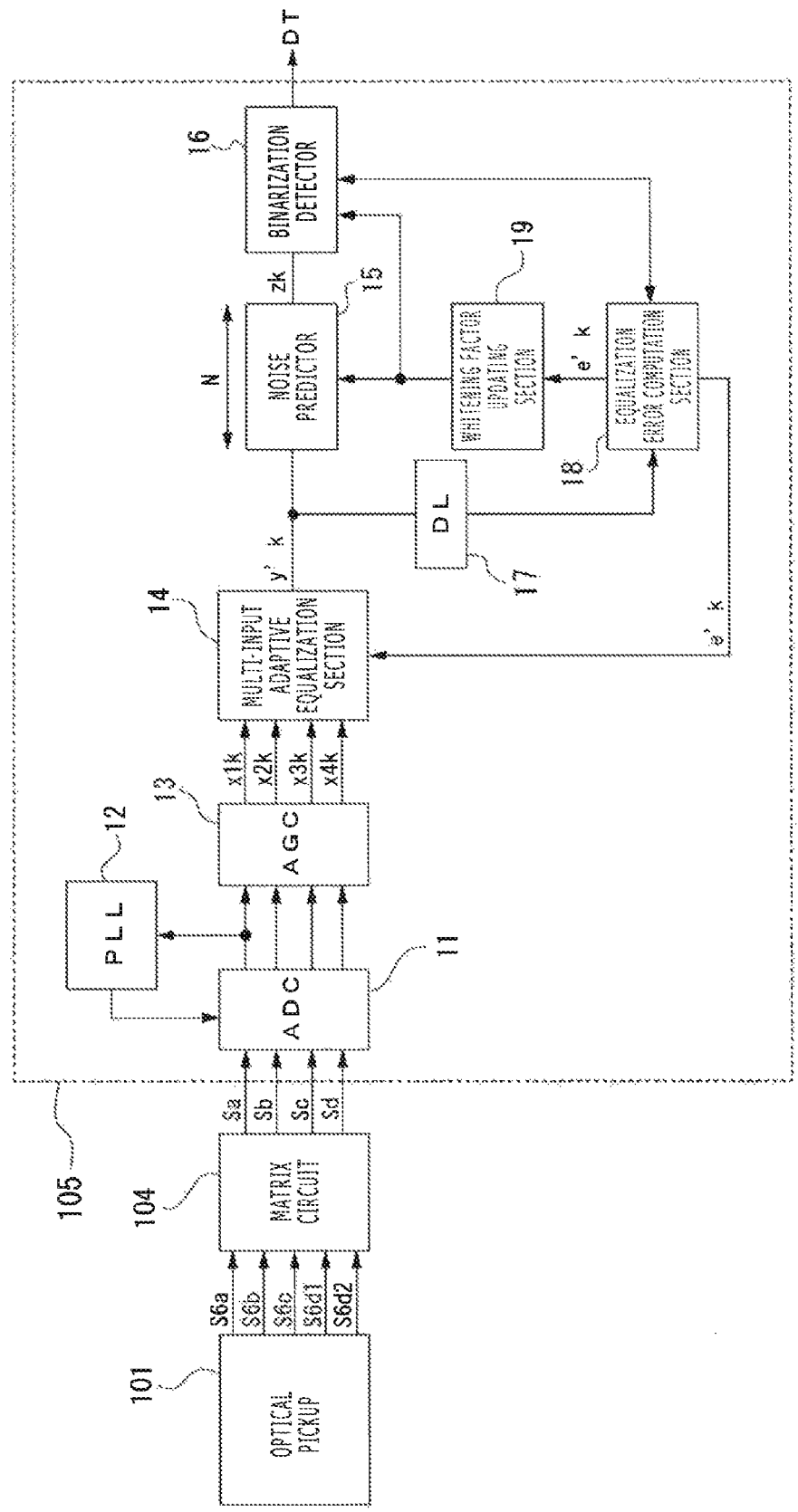
FIG. 3 is a block diagram of a data detection processing section of the embodiment.

The data detection processing section 105 has an A/D converter 11 that is supplied with the playback information signals supplied from the matrix circuit 104 as illustrated in FIG. 3. A clock for the A/D converter 11 is formed by a PLL 12. The playback information signals Sa, Sb, Sc, and Sd supplied from the matrix circuit 104 are each converted into digital data by the A/D converter 11.

Further, gains of the playback information signals Sa, Sb, Sc, and Sd converted into digital data are adjusted by an AGC (Automatic Gain Control) circuit 13.

Further, the data detection processing section 105 has a multi-input adaptive equalization section 14, a noise predictor 15, a binarization detector 16, a delayer 17, an equalization error computation section 18, and a whitening factor updating section 19.

The four-channel playback information signals Sa, Sb, Sc, and Sd supplied to the multi-input adaptive equalization section 14 from the AGC circuit 13 are denoted as signals $x_{1k}$, $x_{2k}$, $x_{3k}$, and $x_{4k}$ (where k is time point), respectively. The multi-input adaptive equalization section 14 performs a PR adaptive equalization process on each of the playback information signals $x_{1k}$, $x_{2k}$, $x_{3k}$, and $x_{4k}$. That is, the playback information signals $x_{1k}$, $x_{2k}$, $x_{3k}$, and $x_{4k}$ are equalized so that the signals are approximated to a target PR waveform. The respective equalization outputs are added up, and an equalization signal $y'_k$ is output. It should be noted that the output of the multi-input adaptive equalization section 14 may be used as a signal input to the PLL 12. In this case, an initial factor of the multi-input adaptive equalizers is set to a predetermined value in advance.

The equalization signal $y'_k$ is supplied to the noise predictor 15 and the delayer 17. The noise predictor 15 performs a filtering process designed to whiten crosstalk noise components from the adjacent tracks TK−1 and TK+1 included in the equalization signal $y'_k$.

An output $z_k$ of the noise predictor 15 is supplied to the binarization detector 16. The binarization detector 16 obtains binarized data DT by performing a binarization process on the equalization signal $z_k$ that has passed through the noise predictor 15. This binary data is supplied to the encoding/decoding section 107 shown in FIG. 1 to proceed with a decoding process.

The equalization error computation section 18 finds an equalization error $e'_k$ of an equalization target for the output (equalization signal) $y'_k$ of the multi-input adaptive equalization section 14 supplied via the delayer 17 and supplies the equalization error $e'_k$ to the plurality of adaptive equalizers in the multi-input adaptive equalization section 14 as a control signal for adaptive equalization. Also, the equalization error computation section 18 supplies the equalization error $e'_k$ to the whitening factor updating section 19.

The whitening factor updating section 19 performs a process of adaptively updating a filter factor of the noise predictor 15, a whitening filter.

A detailed description will be given below of each of the different sections.

Figure 4:
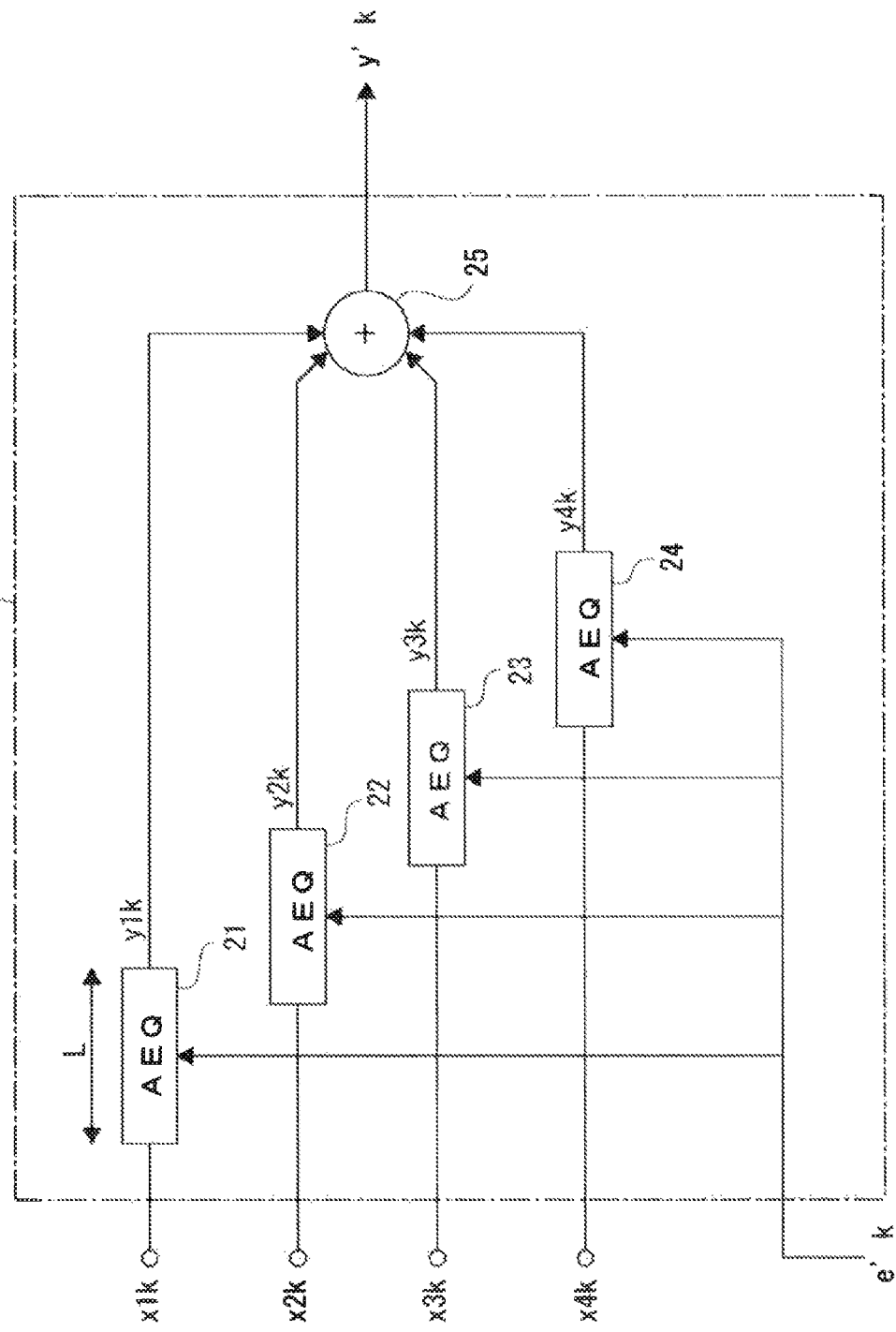
FIG. 4 is a block diagram of a multi-input adaptive equalization section of the embodiment.

The multi-input adaptive equalization section 14 has adaptive equalizers 21, 22, 23, and 24 and an adder 25 as illustrated in FIG. 4. The four-channel playback information signals $x_{1k}$, $x_{2k}$, $x_{3k}$, and $x_{4k}$ described above are input to the adaptive equalizers 21, 22, 23, and 24, respectively. In this example, the four adaptive equalizers 21, 22, 23, and 24 are provided because four-channel playback information signals are used. The number of adaptive equalizers is determined to match with the number of channels of playback information signals.

Each of the adaptive equalizers 21, 22, 23, and 24 has an FIR (Finite Impulse Response) filter tap count, a computation accuracy (bit resolution) thereof, and an updating gain parameter for adaptive computation, and an optimal value is set for each. The equalization error $e'_k$ is supplied to each of the adaptive equalizers 21, 22, 23, and 24 as a factor control value for adaptive control. An output $y_{1k}$ of the adaptive equalizer 21, an output $y_{2k}$ of the adaptive equalizer 22, an output $y_{3k}$ of the adaptive equalizer 23, and an output $y_{4k}$ of the adaptive equalizer 24 are added up by the adder 25 and output as the equalization signal $y'_k$ of the multi-input adaptive equalization section 14. An output target of the multi-input adaptive equalization section 14 is an ideal PR waveform with convolution of the binary detection result with PR.

Figure 5:
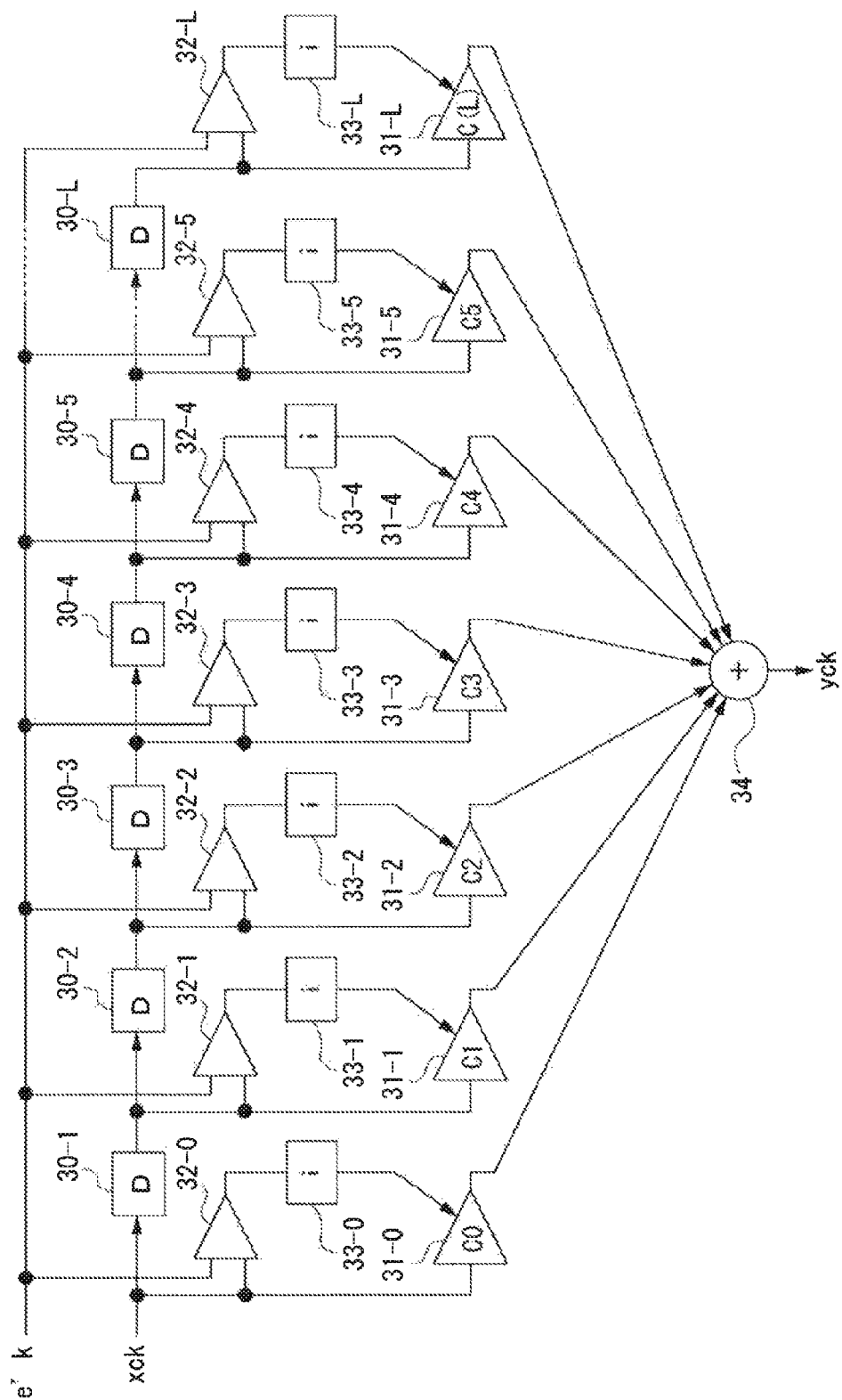
FIG. 5 is a block diagram of an adaptive equalizer of the embodiment.

Each of the adaptive equalizers 21, 22, 23, and 24 includes, for example, an FIR filter as shown in FIG. 5. The adaptive equalizers (21 to 24) are filters having L-stage taps with delay elements 30-1 to 30-L, factor multipliers 31-0 to 31-L, and an adder 34. Each of the factor multipliers 31-0 to 31-L multiplies an input $x_{ck}$ at each point in time by one of tap factors C0 to C(L). The outputs of the factor multipliers 31-0 to 31-L are added up by the adder 34 and extracted as an output $y_{ck}$. It should be noted that "c" in $x_{ck}$ and $y_{ck}$ represents the channel of the playback information signal. Because the present example shows an example with four-channel adaptive equalizers, "c" is one of 1 to 4.

The tap factors C0 to C(L) are controlled for an adaptive equalization process. For this reason, operators 32-0 to 32-L are provided to which the equalization error $e'_k$ and each tap input are input for computation. Also, integrators 33-0 to 33-L are provided to integrate the outputs of the respective operators 32-0 to 32-L. Each of the operators 32-0 to 32-L computes, for example, $-1 \times e'_k \times x_{ck}$. Control is performed such that the outputs of the operators 32-0 to 32-L are integrated by the integrators 33-0 to 33-L and such that the tap factors C0 to C(L) of the factor multipliers 31-0 to 31-L are changed by integration results thereof. It should be noted that integration by the integrators 33-0 to 33-L is intended to adjust adaptive factor control response.

The respective adaptive equalizers 21, 22, 23, and 24 configured as described above optimize errors and phase distortions of input signal frequency components of the playback information signals $x_{1k}$, $x_{2k}$, $x_{3k}$, and $x_{4k}$, i.e., perform adaptive PR equalization. That is, adjustment of the tap factors C0 to C(L) to match with an operation result of $-1 \times e'_k \times x_{ck}$ by the operators 32-0 to 32-n is the operation to adjust the tap factors C0 to C(L) such that the equalization error $e'_k$ is cancelled. Then, the output $y_{1k}$ of the adaptive equalizer 21, the output $y_{2k}$ of the adaptive equalizer 22, the output $y_{3k}$ of the adaptive equalizer 23, and the output yak of the adaptive equalizer 24 are adaptively controlled using the equalization error $e'_k$ such that the tap factors C0 to C(L) achieve a target frequency characteristic. The outputs $y_{1k}$, $y_{2k}$, $y_{3k}$, and $y_{4k}$ turn into outputs with undesired signals such as crosstalk components reduced on a channel-by-channel basis. These outputs $y_{1k}$, $y_{2k}$, $y_{3k}$, and $y_{4k}$ are added up by the adder 25 and serve as the output (equalization signal) $y'_k$ of the multi-input adaptive equalization section 14.

It should be noted, however, that because the playback information signals $x_{1k}$, $x_{2k}$, $x_{3k}$, and $x_{4k}$ are based on laser spot shining as illustrated in FIG. 2B and detection signals of the photodetector 6 divided into areas as illustrated in FIG. 2C, the output (equalization signal) $y'_k$ of the multi-input adaptive equalization section 14 obtained by adding up the outputs $y_{1k}$, $y_{2k}$, $y_{3k}$, and $y_{4k}$ includes crosstalk components of the adjacent tracks TK−1 and TK+1.

For this reason, the output $y'_k$ of the multi-input adaptive equalization section 14 is subjected to crosstalk noise whitening by the noise predictor 15. That is, a system having the noise predictor 15 provided at the subsequent stage of the multi-input adaptive equalization section 14 is used to handle NPML by whitening crosstalk noise.

Waveforms resulting from equalization of the above four-channel playback information signals $x_{1k}$, $x_{2k}$, $x_{3k}$, and $x_{4k}$ respectively by the adaptive equalizers 21, 22, 23, and 24 are expressed by the following Formula 1:

$$y_k = \begin{pmatrix} y_{1k} \\ y_{2k} \\ y_{3k} \\ y_{4k} \end{pmatrix} = f_k^T x_k = \begin{pmatrix} \overrightarrow{f_{1k}} & \overrightarrow{f_{2k}} & \overrightarrow{f_{3k}} & \overrightarrow{f_{4k}} \end{pmatrix} \begin{pmatrix} \overrightarrow{x_{1k}} \\ \overrightarrow{x_{2k}} \\ \overrightarrow{x_{3k}} \\ \overrightarrow{x_{4k}} \end{pmatrix} \quad \text{Formula 1}$$

The output $y'_k$ of the multi-input adaptive equalization section 14 is expressed by Formula 2 that adds up these vector elements.

$$y'_k = \sum_{c=1}^{4} y_{ck} = \sum_{c=1}^{4} \sum_{i=0}^{L-1} f_{ci} \cdot x_{ck-i} = \sum_{m=0}^{K-1} c_m \cdot a_{k-m} + v_k + w_k \quad \text{Formula 2}$$

Here, $c_m$ is the impulse response of ISI (Intersymbol interference) for target partial response, and $a_{k-m}$ represents the receiving channel bit NRZ (Non Return to Zero) sequence (−1/+1). $v_k$ represents the error between the output $y'_k$ and the level of the target partial response, and $w_k$ represents the noise component including crosstalk.

It is possible to suppress noise power of branch metric operations for Viterbi decoding by the binarization detector 16 by passing this output $y'_k$ through the noise predictor 15 at the subsequent stage and whitening the crosstalk frequency component.

The output $z_k$ of the noise predictor 15 is expressed by the following Formula 3:

$$z_k = y'_k - \sum_{i=1}^{N} p_i \cdot y'_{k-i} \quad \text{Formula 3}$$

FIG. 6A illustrates a configuration example of the noise predictor 15.

The noise predictor 15 specifically includes an FIR filter made up of N-stage delayers 41-1 to 41-N, N multipliers 42-1 to 42-N, and an accumulating adder 43 as illustrated in FIG. 6A. The delayers 41-1 to 41-N receive the output $y'_k$ of the multi-input adaptive equalization section 14 and delays the output $y'_k$ every sample. The multipliers 42-1 to 42-N multiply the outputs of the delayers 41-1 to 41-N by a tap factor $p_i$ (where i is an integer). The accumulating adder 43 accumulates the input of the delayer 41-1 at the first stage and the outputs of the multipliers 42-1 to 42-N and outputs the output signal $z_k$.

It should be noted that a value generated by the whitening factor updating section 19 is set as the tap factor $p_i$ given to each of the multipliers 42-1 to 42-N as will be described later.

The binarization detector 16 is, for example, a Viterbi decoder and obtains the binarized data DT by performing a maximum likelihood decoding process on the equalization signal $z_k$ that has been PR-equalized and has passed through the noise predictor 15.

Viterbi decoding uses a Viterbi decoder made up of a plurality of states made up of consecutive bits of a given length and branches represented by transitions between the states. Viterbi decoding is configured such that a desired bit sequence is detected highly efficiently from among all possible bit sequences.

In an actual circuit, two registers are available for each state, one register called a path metric register that stores a partial response sequence and a signal path metric up to that state, and another register called a path memory register that stores a bit sequence flow up to that state. Further, a computation unit called a branch metric unit is available for each branch. The branch metric unit calculates a partial response sequence and a signal path metric for that bit.

This Viterbi decoder can associate various bit sequences in a one-to-one relationship using one of the paths passing through states. Also, a path metric between a partial response sequence passing through these paths and an actual signal (playback signal) is obtained by successively adding state-to-state transitions making up the above path, i.e., the branch metrics described earlier in a branch.

Further, selection of a path that provides the minimum path metric can be realized by comparing which of path metrics of two or less branches to each state is greater or smaller and successively selecting the path with a smaller path metric. Information representing the path to each state with a bit sequence is stored by transferring this selection information to the path memory register. The value of the path memory register converges to a bit sequence that eventually provides the minimum path metric while being successively updated. Therefore, the result thereof is output.

A description will be given of a calculation method of a branch metric used for NPML decoding in the binarization detector 16.

In general, branch metric operation for Viterbi decoding is defined by a waveform equalization error, i.e., the difference between a reference level and a received waveform, and square of noise. If the square of the noise component $w_k$ in the above Formula 2 is a branch metric, and if the noise component $w_k$ whitened by the factor of the noise predictor 15 is a branch metric, the branch metric calculation for transition from state $s_j$ to state $s_i$ is expressed as shown in Formula 4.

Formula 4

$$\lambda_k(s_i, s_j) = \left[\left\{y'_k - \left(\sum_{m=0}^{K-1} c_m \cdot a_{k-m} + v_k\right)\right\} - \sum_{i=1}^{N} p_i \cdot \left\{y'_{k-i} - \left(\sum_{m=0}^{K-1} c_m \cdot a_{k-i-m} + v_{k-i}\right)\right\}\right]^2$$

$$= \left[\left\{y_k - \left(\sum_{i=1}^{N} p_i \cdot y'_{k-i}\right)\right\} - \left\{\sum_{m=0}^{K-1} c_m \cdot a_{k-m} + v_k - \sum_{i=1}^{N} p_i \cdot \left(\sum_{m=0}^{K-1} c_m \cdot a_{k-i-m} + v_{k-i}\right)\right\}\right]^2$$

$$= \left[z_k - \underbrace{\left\{r_k(s_i, s_j) + \Delta r_k(\vec{a}_k) - \sum_{i=1}^{N} p_i \cdot \{r_{k-i}(s_i, s_j) + \Delta r_k(\vec{a}_{k-i})\}\right\}}_{MR}\right]^2$$

It should be noted that vector elements of $a_k$ are as follows:

Formula 5

$$\vec{a}_k = \begin{pmatrix} a_k \\ a_{k-i} \\ \vdots \\ a_{k-(M-1)} \end{pmatrix}$$

This Formula 4 can be rearranged into convolution of the waveform $z_k$ after the passage of the output $y'_k$ of the multi-input adaptive equalization section 14 through the noise predictor 15 and the reference level with the tap factor $p_i$ of the noise predictor 15.

It should be noted, however, that the ISI length for partial response considered in Viterbi decoding is denoted as K, and that the ISI length that causes interference from past data patterns relative to the target reference level for partial response is denoted as M. In general, M≥K. Also, the tap factor length other than impulse of the noise predictor 15 is denoted as N. Here, a description will be given of an example in which K=3, M=3, N=1, PR (1, 1, 1) (c0=1, c1=1, c2=1), and the minimum run length d=1.

Figure 7:
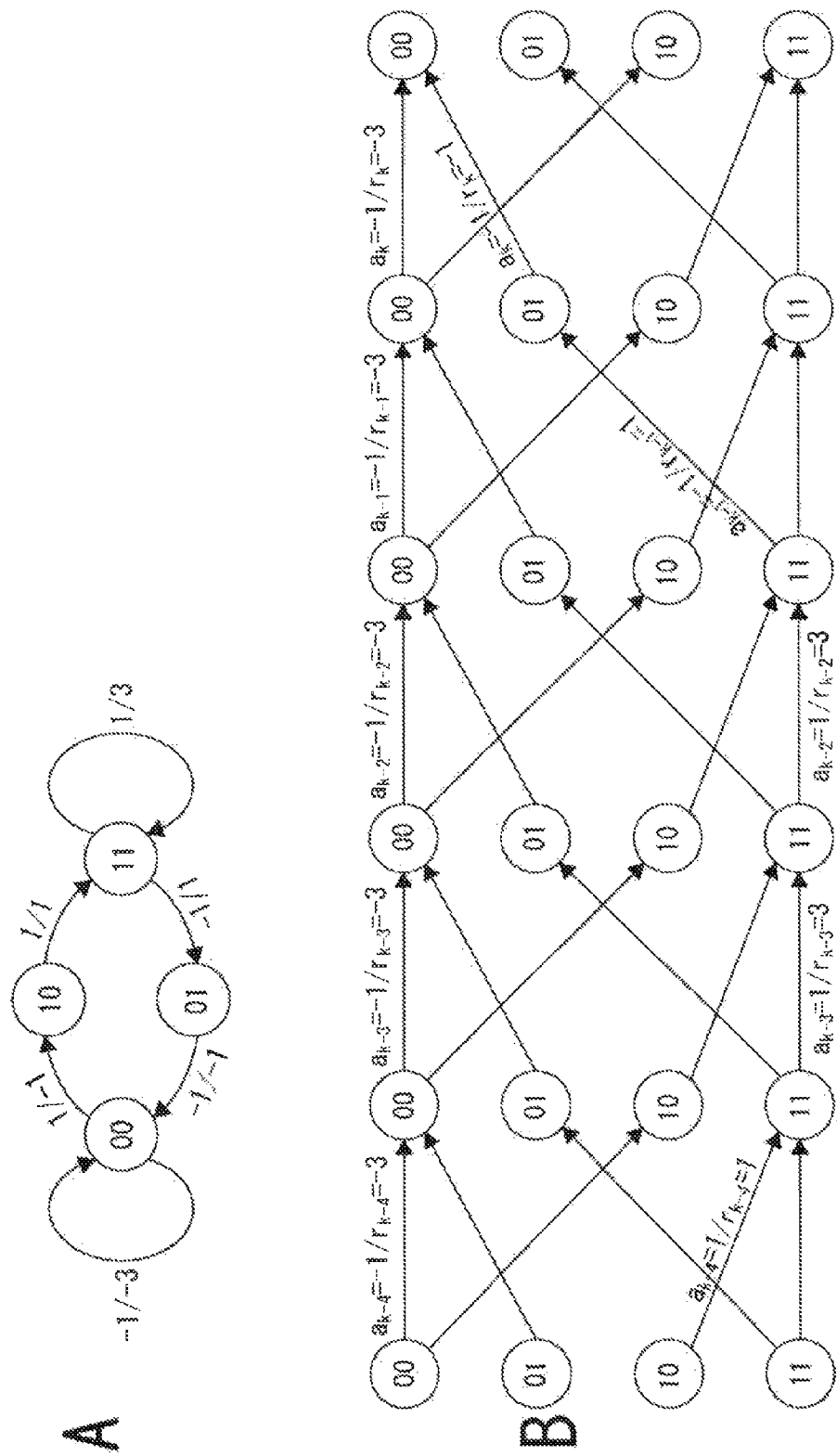
FIG. 7 illustrates a trellis diagram and an explanatory diagram of state transitions in a decoding process of the embodiment.

Because d=1 and K=3, the state transition diagram illustrated in FIG. 7A and the trellis diagram illustrated in FIG. 7B are plotted by treating data at two time points in the past as states.

For example, as for the branches to state 00 (hereinafter, states may be denoted with "s" as in "s00"), one branch makes a transition from state 00 at $a_k=-1$, and another branch makes a transition from state 01 at $a_k=-1$.

From the above Formula 4, the reference level portion of the branch metric for the branch whose transition from state 00 occurs at $a_k=-1$ is found by the value obtained by convolution of $r_k$ (s00, s00)=−3, $r_{k-1}$=(s00, s00)=−3 (constants determined by state transitions), $\Delta r_k$ ($a_{k-2}=-1$, $a_{k-1}=-1$, $a_k=-1$), and $\Delta r_{k-1}$ ($a_{k-3}=-1$, $a_{k-2}=-1$, $a_{k-1}=-1$) (values found by memory access) with the tap factor $p_i$ of the noise predictor 15.

Also, the reference level portion of the branch metric for the branch whose transition from state 01 occurs at $a_k=-1$ is found by the value obtained by convolution of $r_k$(s01, s00)=1, $r_{k-1}$=(s00, s00)=−1 (constants determined by state transitions), $\Delta r_k$ ($a_{k-2}=1$, $a_{k-1}=-1$, $a_k=-1$), and $\Delta r_{k-1}=$ ($a_{k-3}=1$, $a_{k-2}=1$, $a_{k-1}=-1$) (values found by memory access) individually with the tap factor $p_i$ of the NP.

It should be noted that although $r_k$ is a value found from ISI, $\Delta r_k$ is a value learned as an equalization error, and this can be found by memory access. This will be described together with updating of the filter factor, the next topic.

A description will be given next of updating of the filter factor of the multi-input adaptive equalization section 14 based on the LMS (Least Mean Square) algorithm of the equalization error computation section 18. The equalization error computation section 18 calculates, for the output $y'_k$ of the multi-input adaptive equalization section 14 that is supplied after timing adjustment by the delayer 17, the equalization error $e'_k$, a difference from the equalization target signal obtained by the convolution process of the binarization result of the binarization detector 16. Then, the equalization error computation section 18 supplies this equalization error $e'_k$ to control the tap factor of each of the adaptive equalizers 21, 22, 23, and 24 of the multi-input adaptive equalization section 14.

The reference level by provisional judgment of received data can be obtained from the memory by using the Viterbi decoding result as an address, and the difference from the output $y'_k$ of the multi-input adaptive equalization section 14 can be calculated as shown in Formula 6 as an LMS error (equalization error $e'_k$).

$$e'_k = y'_k - \{r_k(\vec{a}_k) + \Delta r_k(\vec{a}_k)\} \qquad \text{Formula 6}$$

As described above, $r_k$ is a value found from ISI, and $\Delta r_k$ is a value learned as an equalization error. This $\Delta r_k$ can be learned cyclically by Formula 7 shown next. $\gamma$ is the learning update factor.

$$\Delta r_{k+1}(\vec{a}_k) = \Delta r_k(\vec{a}_k) - \gamma \cdot 2 \cdot e'_k \qquad \text{Formula 7}$$

This $\Delta r_k$ learning is schematically illustrated in FIG. 8. FIG. 8A schematically illustrates the path memory in the binarization detector 16 (Viterbi decoder). The path memory stores a binarization detection result at each time point (k). Here, $\Delta r_k$ can be referred to by detection results $a_{k-(M-1)}$ to $a_k$.

FIG. 8B illustrates a memory area available for $\Delta r_k$ learning in the binarization detector 16. As illustrated, learning storage areas 51 (51-000, 51-001, . . . , and 51-111) are available to match with addresses "000," "100," . . . , and "111" as the detection results $a_{k-(M-1)}$ to $a_k$.

The updated $\Delta r_k$ is written to each of the learning storage areas 51 to match with the address (switches 54 schematically show write accesses to match with addresses).

That is, the value stored in each of the learning storage areas 51 is updated to the value obtained by an operator 53 adding $-\gamma \cdot 2 \cdot e'_k$ to the value at the previous time point delayed by a delayer 52 when write is specified by the address. That is, the values of the learning storage areas 51 are updated as $\Delta r_{k+1}$ in Formula 7.

During the branch metric calculation in the above Formula 4, $\Delta r_k$ can be obtained by referring to the learning storage areas 51 using the detection results $a_{k-(M-1)}$ to $a_k$ of the path memory at each point in time.

The equalization error computation section 18 calculates the LMS error (equalization error $e'_k$), a difference between the reference level by provisional judgment of received data and the output $y'_k$ of the multi-input adaptive equalization section 14, as shown in the above Formula 6.

Here, the factor of the multi-input adaptive equalization section 14 can be learned by partially differentiating the square error of the equalization error $e'_k$ with the tap factors of the adaptive equalizers 21, 22, 23, and 24 of the multi-input adaptive equalization section 14 as shown below in Formula 8 and learning the square error with an update factor $\alpha$ as shown in Formula 9.

$$\frac{\partial}{\partial f_{ci}} e'^2_k = 2 \cdot e'_k \cdot x_{ck-i} \qquad \text{Formula 8}$$

$$f_{ci}(t) = f_{ci}(t-1) - \alpha \cdot 2 \cdot e'_k \cdot x_{ck-i} \qquad \text{Formula 9}$$

A description will be given next of updating of the tap factor $p_i$ of the noise predictor 15 by the whitening factor updating section 19.

The whitening factor updating section 19 obtains a signal $w'_k$ in Formula 10 by using the equalization error $e'_k$ from the equalization error computation section 18.

$$w'_k = e'_k - \sum_{i=1}^{N} p_i \cdot e'_{k-i} \qquad \text{Formula 10}$$

In this case, the signal $w'_k$ is obtained by the FIR filter shown in FIG. 6B having the equalization error $e'_k$ as its input. This FIR filter has the same configuration as the FIR filter serving as the noise predictor 15 shown in FIG. 6A.

Then, in order to minimize this minimum square error, the tap factor $p_i$ of the noise predictor 15 is learned by an update factor $\beta$ as in Formula 12 using a partial differential result as in Formula 11.

$$\frac{\partial}{\partial p_i} w'^2_k = -2 \cdot w'_k e'_{k-i} \qquad \text{Formula 11}$$

$$p_i(t) = p_i(t-1) + \beta \cdot 2 \cdot w'_k \cdot e'_{k-i} \qquad \text{Formula 12}$$

Thus, when the tap factor $p_i$ is obtained, that tap factor $p_i$ ($-p_1$ to $-p_N$) is set as each of the tap factors $p_i$ ($-p_1$ to $-p_N$) of the noise predictor 15. As a result, noise is whitened by the noise predictor 15.

That is, it is possible to whiten crosstalk noise by providing the noise predictor 15 for the output $y'_k$ of the multi-input adaptive equalization section 14 and using the LMS algorithm.

Also, the tap factor $p_i$ set for the noise predictor 15 by the whitening factor updating section 19 is supplied to the binarization detector 16.

The binarization detector 16 performs metric operations using the tap factor $p_i$ set by the whitening factor updating section 19. That is, the tap factor $p_i$ is used for branch metric calculation as shown above in Formula 4. As a result, Viterbi decoding is realized which is suitable for NPML having the noise predictor 15.

Incidentally, considering high-speed operation in digital circuitry for reference level convolution in the above Formula 4 because of a large number of multiply-and-accumulate operations, it is difficult to complete the calculation within one clock. This is the portion shown as "MR" in the above Formula 4.

For this reason, it is only necessary to have ready a memory that can be accessed with M+N time points worth of (M+N)-bit addresses and store a convolutional result in each of the addresses.

As described above, if the state transition diagram in FIG. 7A and the trellis diagram in FIG. 7B are plotted by treating data at two time points in the past as states with d=1 and K=3, and if, for example, the branch leading to state 00 is considered, the memory value accessed with $(a_{k-3}, a_{k-2}, a_{k-1}, a_k)=(-1, -1, -1, -1)$ of M+N=4 bits is extracted as a reference level in the case of the branch that makes a transition from state 00 at $a_k=-1$. The (M+N=4)-bit addresses are the values of the detection results $a_{k-(M-1+N)}$ to $a_k$ shown in the path memory in FIG. 8A.

Also, in the case of the branch that makes a transition from state 01 at $a_k=-1$, the memory value accessed with $(a_{k-3}, a_{k-2}, a_{k-1}, a_k)=(1, 1, -1, -1)$ is extracted as a reference level.

As a result, a branch metric can be calculated within one clock.

Figure 9:
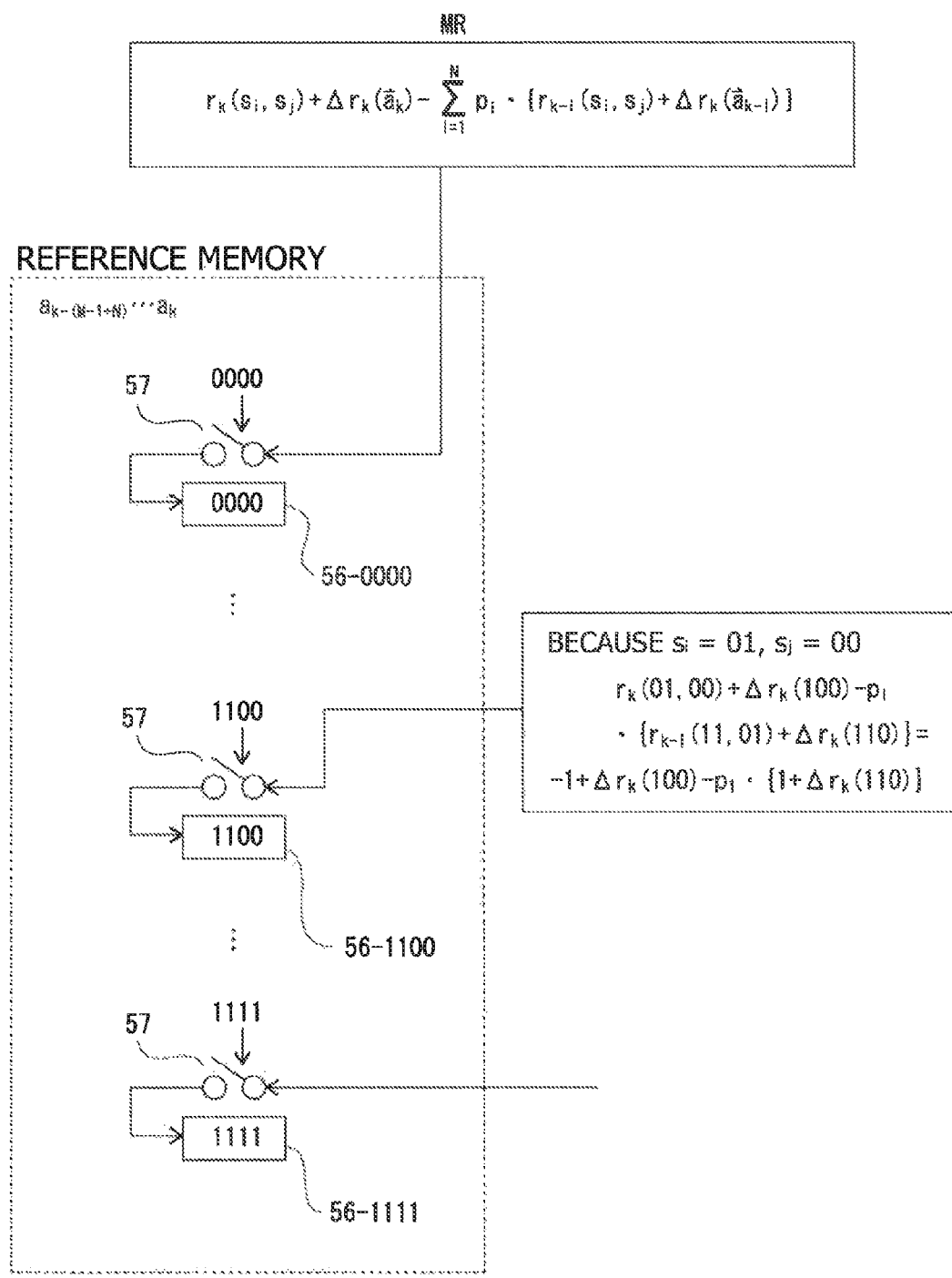
FIG. 9 is an explanatory diagram of reference level storage of the embodiment.

FIG. 9 illustrates a reference memory available in the binarization detector 16.

Storage areas 56 (56-0000, . . . , 56-1100, . . . , and 56-1111) are available to match with the addresses "0000," . . . , "1100," . . . , and "1111" serving as the detection results $a_{k-(M-1+N)}$ to $a_k$.

A calculated value (MR) (refer to Formula 4) at each time point k is written to each of the storage areas 56 to match with the address. A switch 57 schematically shows that a write access is made to match with the address. It should be noted that the formula for the calculated value MR in the case of a transition from state $s_j$ to state $s_i$ (s00→s01) is specifically shown as a value written to the storage area 56-1100 in the figure.

Thus, the reference memory is continuously updated, and during branch metric calculation, the calculated convolutional value MR of the reference level in the past is read to match with the address. As a result, branch metric calculation can be performed within one clock. It should be noted that although the actual calculated value MR is computed, for example, using a pipeline memory in the binarization detector 16 and this itself is difficult to complete within one clock, the calculated value gradually approaches an appropriate value as a result of repetition of write to the reference memory. That is, the branch metric calculation is completed within one clock by reading the calculated value MR from the reference memory. As for the value stored in the reference memory, on the other hand, the stored value is allowed to converge to an appropriate value through successive updating.

An example will be shown next in which the factor $p_i$ is updated in such a manner as to maximize an SNR (signal-noise ratio) of crosstalk noise as another example of updating the factor of the noise predictor 15 by the whitening factor updating section 19. That is, this is an example of reducing noise while at the same time increasing the minimum path distance in the maximum likelihood decoding.

For example, when the pattern making up the minimum distance is { . . . 1001100000000} and { . . . 0011100000000}, and when respective vectors are denoted as follows:

$$\vec{A}_i=\{1001100000000\}$$

$$\vec{B}_i=\{0011100000000\}$$ Formula 13 then, the minimum square distance of the detector is denoted as shown in Formula 14.

$$d_{min}^2 = \sum_{m=0}^{M-1} \left\{ \sum_{i=0}^{N} p_i \cdot r'_k(\vec{A}_{-(i+m)}) - \sum_{i=0}^{N} p_i \cdot r'_k(\vec{B}_{-(i+m)}) \right\}^2$$

$$= \sum_{m=0}^{M-1} \left[ \sum_{i=0}^{N} p_i \cdot \{r'_k(\vec{A}_{-(i+m)}) - r'_k(\vec{B}_{-(i+m)})\} \right]^2$$ Formula 14

The following should be noted:

$$r'_k(\vec{a}_k) = r_k(\vec{a}_k) + \Delta r(\vec{a}_k)$$ Formula 15

A crosstalk noise ratio Formula 16 is denoted as follows:

$$E^2 = \left( \frac{w'_k}{d_{min}} \right)^2$$ Formula 16

Then, partial differentiation with the factor $p_i$ of the noise predictor 15 gives the following Formula 17:

$$\frac{\partial}{\partial p_i} E^2 = 2 \left( \frac{w'_k}{d_{min}} \right) \cdot \left( \frac{\partial w'_k}{\partial p_i} \cdot \frac{1}{d_{min}} - w'_k \cdot \frac{1}{d_{min}^2} \cdot \frac{\partial d_{min}}{\partial p_i} \right)$$ Formula 17

$$= \frac{1}{d_{min}^2} \left[ d_{min} \cdot (-e'_{k-i}) - 2 \cdot w'_k \cdot \sum_{m=0}^{M-1} \left[ \sum_{i=0}^{N} \Box p_i \cdot \{r'_k(\vec{A}_{-(i+m)}) - r'_k(\vec{B}_{-(i+m)})\} \right] \cdot \{r'_k(\vec{A}_{-(i+m)}) - r'_k(\vec{B}_{-(i+m)})\} \right]$$

Using this result, the factor $p_i$ of the noise predictor 15 is updated with Formula 18.

$$p_i(t) = p_i(t-1) - \beta \cdot \frac{\partial}{\partial p_i} E^2$$ Formula 18

It is possible to obtain the signal $z_k$ that leads to the maximum crosstalk SNR and improve the Viterbi decoding capability by updating the factor $p_i$ obtained by this Formula 18 as the factor $p_i$ of the noise predictor 15.

3. CONCLUSION AND MODIFICATION EXAMPLE

In the present embodiment described above, the plurality of detection signals generated by using the photoreceptor signals of the plurality of divided areas of the photodetector 6 for returning light at the time of shining of light onto bounds including the target track TK subject to data detection and the adjacent tracks TK−1 and TK+1 of an optical recording medium having a plurality of tracks formed thereon, are input to the respective adaptive equalizers 21, 22, 23, and 24 of the multi-input adaptive equalization section 14 of the data detection processing section 105. That is, the detection signals are input to the adaptive equalizers 21, 22, 23, and 24 as the four-channel playback information signals $x_{1k}$, $x_{2k}$, $x_{3k}$, and $x_{4k}$, respectively. Then, the output $y'_k$ as the equalization signal is obtained by computing the outputs $y_{1k}$, $y_{2k}$, $y_{3k}$, and $y_{4k}$ of the plurality of respective adaptive equalizers 21, 22, 23, and 24. Crosstalk noise of the output $y'_k$ (equalization signal) of the multi-input adaptive equalization section 14 from the adjacent tracks TK−1 and TK+1 is whitened by the noise predictor 15, a whitening filter. Then, the binarization detector 16 obtains the binarized data DT by performing a binarization process on the equalization signal ($z_k$) that has passed through the noise predictor 15.

Also, the equalization error computation section 18 finds the equalization error $e'_k$ relative to the equalization target for the equalization signal ($y'_k$) output from the multi-input adaptive equalization section 14 and supplies the equalization error $e'_k$ to the plurality of adaptive equalizers 21, 22, 23, and 24 as a control signal for adaptive equalization.

Also, the whitening factor updating section 19 adaptively updates the filter factor $p_i$ of the noise predictor 15.

As a result, crosstalk noise included in the output $y'_k$ (equalization signal) of the multi-input adaptive equalization section 14 is whitened first, followed by binarization by the binarization detector 16.

That is, in the present embodiment, it is possible to suppress noise power of branch metric operations for Viterbi decoding by the binarization detector 16 and improve detection accuracy by performing a binarization process using a crosstalk noise whitening equalization waveform.

FIG. 10A illustrates an equalization target TPR relative to a playback information signal MTF. The arrows represent enhancement by PR equalization. Also, crosstalk noise CNZ is represented by a dotted line and a long dashed short dashed line. This crosstalk noise is significantly enhanced by PR equalization.

If the output y' in such a condition is supplied to the binarization detector 16 in an "as-is" fashion, the output y' leads to reduced maximum likelihood path detection accuracy in Viterbi decoding as illustrated in FIG. 10B.

On the other hand, FIG. 10C similarly illustrates the playback information signal MTF, the equalization target TPR, and the crosstalk noise CNZ in a case where the noise predictor 15 is provided as in the present embodiment.

In this case, the crosstalk noise CNZ is whitened. If the output z of the noise predictor 15 in such a condition is supplied to the binarization detector 16, the output z is as illustrated in FIG. 10D. As a result, it is possible to suppress noise power of branch metric operations and improve maximum likelihood path detection accuracy in Viterbi decoding.

In general, crosstalk noise enhancement can be reduced by designing a PR-ISI close to a high-density MTF. However, it is difficult to predict this ISI in advance. However, it is possible to reduce crosstalk noise enhancement during high density and improve data detection capability by using an adaptive noise whitening filter.

FIG. 11A illustrates a power spectrum density for LMS error using a playback waveform with crosstalk in 35 GB. The vertical axis is the crosstalk noise power density, and the horizontal axis is the standardized channel frequency (channel frequency standardized to 1.0). This is the calculation result of the power spectrum density through FFT (Fast Fourier Transform) of $e'_k$ in Formula 6 and $w'_k$ in Formula 10 to investigate whether noise has been whitened.

It should be noted that "PRML" in FIG. 11 corresponds to a case in which the noise predictor 15 is not provided and "NPML" in FIG. 11 corresponds to a case in which the noise predictor 15 is provided.

From this result, it is clear that LMS error has been whitened.

On the other hand, FIG. 11B illustrates a change in bER (bit Error Rate) of a learning result of 12 sectors similarly for a playback waveform with crosstalk in 35 GB when a 420000-bit dataset is one sector, and it is clear that the NPML result has become error-free and improved after convergence.

Also, the noise predictor 15 can be adaptively operated to whiten crosstalk noise included in the output $y'_k$ of the multi-input adaptive equalization section 14 through adaptive updating of the filter factor of the noise predictor 15.

In particular, the whitening factor updating section 19 updates the filter factor of the whitening filter in such a manner as to minimize the crosstalk noise energy using the equalization error $e'_k$ obtained by the equalization error computation section 18 (refer to Formula 10 to Formula 12). As a result, whitening of crosstalk noise can be optimized.

Also, the whitening factor updating section 19 updates the filter factor of the noise predictor 15 in such a manner as to maximize the ratio between the crosstalk noise energy of the equalization signal ($y'_k$) and the minimum distance in the maximum likelihood decoding process (refer to Formula 1.4 to Formula 18). As a result, the whitening filter process can be optimized to match with maximum likelihood decoding.

Also, the binarization detector 16 performs metric operations using the filter factor ($p_i$) of the noise predictor 15 set by the whitening factor updating section 1.9 (refer to Formula 4). This realizes NPML to match with the signal ($z_k$) input via the noise predictor 15.

Also, it is possible to reduce processing load for branch metric operations by reading, from the reference memory 56 using the past judgment results ($a_{k-(M-1+N)}$ to $a_k$) as an address, the reference level (calculated value MR in Formula 4) calculated using the filter factor of the whitening filter and stored in the memory and by using the reference level as a reference level to be used for metric operations of the maximum likelihood decoding process.

Although the embodiment of the present disclosure has been described specifically up to this point, the present disclosure is not limited to the above embodiment, and various modifications may be made based on the technical ideas of the present disclosure. For example, the numerical values of the waveform of the laser light source, the track pitch, and the recording linear density described above are merely examples, and other numerical values may be used. Further, indicators other than the above may be used as indicators for evaluating the playback performance. Further, the present disclosure is also applicable to playback devices that handle only recording to or playback from an optical disc.

Also, the effect described in the present specification is merely illustrative and not restrictive, and other effects are allowed.

It should be noted that the present technology can also have the following configurations:

(1) A data detection device including:

a multi-input adaptive equalization section in which each of a plurality of detection signals generated by using photoreceptor signals of a plurality of divided areas of an optical detection section is input to one of a plurality of adaptive equalizers, and outputs of the plurality of adaptive equalizers are computed and output as an equalization signal for returning light at the time of shining of light onto bounds including a target track subject to data detection and adjacent tracks of an optical recording medium having a plurality of tracks formed thereon;

a whitening filter configured to whiten crosstalk noise from the adjacent tracks included in the equalization signal output from the multi-input adaptive equalization section;

a binarization section configured to obtain binary data by performing a binarization process on the equalization signal that has passed through the whitening filter; an equalization error computation section configured to find an equalization error from an equalization target signal obtained based on a binary detection result of the binarization section and from the equalization signal output from the multi-input adaptive equalization section and supply the equalization error to the plurality of adaptive equalizers as a control signal for adaptive equalization; and a whitening factor updating section configured to adaptively update a filter factor of the whitening filter.

(2) The data detection device of feature (1), in which the whitening factor updating section updates the filter factor of the whitening filter in such a manner as to minimize crosstalk noise energy using the equalization error obtained by the equalization error computation section.

(3) The data detection device of feature (1), in which the multi-input adaptive equalization section performs a partial response equalization process on each of the plurality of detection signals, the binarization section performs a maximum likelihood decoding process as a binarization process of the equalization signal, and the whitening factor updating section updates the filter factor of the whitening filter in such a manner as to maximize a ratio between the crosstalk noise energy of the equalization signal and a minimum distance in the maximum likelihood decoding process.

(4) The data detection device of feature (2) or feature (3), in which the binarization section performs metric operations using the filter factor of the whitening filter set by the whitening factor updating section.

(5) The data detection device of any one of feature (1) to feature (4), in which the multi-input adaptive equalization section performs a partial response equalization process on each of the plurality of detection signals, and the binarization section performs the maximum likelihood decoding process as a binarization process of the equalization signal, reads, from a memory by using past judgment results as an address, a reference level calculated using the filter factor of the whitening filter and stored in the memory, and uses the reference level as a reference level to be used for the metric operations of the maximum likelihood decoding process.

(6) A playback device including:

an optical detection section configured to receive, with a plurality of divided areas, returning light at the time of shining of light onto bounds including a target track subject to data detection and adjacent tracks of an optical recording medium having a plurality of tracks formed thereon and configured to generate a plurality of detection signals using photoreceptor signals of the plurality of divided areas;

a multi-input adaptive equalization section in which each of the plurality of detection signals is input to one of a plurality of adaptive equalizers, and in which outputs of the plurality of adaptive equalizers are computed and output as an equalization signal;

a whitening filter configured to whiten crosstalk noise from the adjacent tracks included in the equalization signal output from the multi-input adaptive equalization section;

a binarization section configured to obtain binary data by performing a binarization process on the equalization signal that has passed through the whitening filter; an equalization error computation section configured to find an equalization error from an equalization target signal obtained based on a binary detection result of the binarization section and from the equalization signal output from the multi-input adaptive equalization section and supply the equalization error to the plurality of adaptive equalizers as a control signal for adaptive equalization;

a whitening factor updating section configured to adaptively update a filter factor of the whitening filter; and a demodulation section configured to demodulate playback data from the binary data obtained by the binarization section.

(7) A data detection method of a data detection device to which a plurality of detection signals generated by using photoreceptor signals of a plurality of divided areas of an optical detection section are input for returning light at the time of shining of light onto bounds including a target track subject to data detection and adjacent tracks of an optical recording medium having a plurality of tracks formed thereon, the data detection method including:

a multi-input adaptive equalization process of inputting each of the plurality of detection signals to one of a plurality of adaptive equalizers and computing outputs of the plurality of adaptive equalizers thereby to obtain an equalization signal;

a whitening process of whitening crosstalk noise from the adjacent tracks included in the equalization signal obtained by the multi-input adaptive equalization process;

a binarization process of detecting binary data from the equalization signal subjected to the whitening process; an equalization error computation process of finding an equalization error from an equalization target signal obtained based on a binary detection result of the binarization process and from the equalization signal obtained by the multi-input adaptive equalization process and supplying the equalization error to the plurality of adaptive equalizers as a control signal for adaptive equalization; and a whitening factor updating process of adaptively updating a filter factor of the whitening process.

REFERENCE SIGNS LIST

6 . . . Photodetector
14 . . . Multi-input adaptive equalization section
15 . . . Noise predictor
16 . . . Binarization detector
18 . . . Equalization error computation section
19 . . . Whitening factor updating section
105 . . . Data detection processing section

The invention claimed is:

1. A data detection device comprising:
a multi-input adaptive equalization section in which each of a plurality of detection signals generated by using photoreceptor signals of a plurality of divided areas of an optical detection section is input to one of a plurality of adaptive equalizers, and outputs of the plurality of adaptive equalizers are computed and output as an equalization signal for returning light at the time of shining of light onto bounds including a target track subject to data detection and adjacent tracks of an optical recording medium having a plurality of tracks formed thereon;
a whitening filter configured to whiten crosstalk noise from the adjacent tracks included in the equalization signal output from the multi-input adaptive equalization section;
a binarization section configured to obtain binary data by performing a binarization process on the equalization signal that has passed through the whitening filter;

an equalization error computation section configured to find an equalization error relative to an equalization target for the equalization signal output from the multi-input adaptive equalization section and supply the equalization error to the plurality of adaptive equalizers as a control signal for adaptive equalization; and a whitening factor updating section configured to adaptively update a filter factor of the whitening filter.

2. The data detection device of claim 1, wherein
the whitening factor updating section updates the filter factor of the whitening filter in such a manner as to minimize crosstalk noise energy using the equalization error obtained by the equalization error computation section.

3. The data detection device of claim 1, wherein
the multi-input adaptive equalization section performs a partial response equalization process on each of the plurality of detection signals,
the binarization section performs a maximum likelihood decoding process as a binarization process of the equalization signal, and
the whitening factor updating section updates the filter factor of the whitening filter in such a manner as to maximize a ratio between the crosstalk noise energy of the equalization signal and a minimum distance in the maximum likelihood decoding process.

4. The data detection device of claim 2, wherein
the binarization section performs metric operations using the filter factor of the whitening filter set by the whitening factor updating section.

5. The data detection device of claim 1, wherein
the multi-input adaptive equalization section performs a partial response equalization process on each of the plurality of detection signals, and
the binarization section performs a maximum likelihood decoding process as a binarization process of the equalization signal, reads, from a memory by using past judgment results as an address, a reference level calculated using the filter factor of the whitening filter and stored in the memory, and uses the reference level as a reference level to be used for the metric operations of the maximum likelihood decoding process.

6. A playback device comprising:
an optical detection section configured to receive, with a plurality of divided areas, returning light at the time of shining of light onto bounds including a target track subject to data detection and adjacent tracks of an optical recording medium having a plurality of tracks formed thereon and configured to generate a plurality of detection signals using photoreceptor signals of the plurality of divided areas;

a multi-input adaptive equalization section in which each of the plurality of detection signals is input to one of a plurality of adaptive equalizers, and in which outputs of the plurality of adaptive equalizers are computed and output as an equalization signal;

a whitening filter configured to whiten crosstalk noise from the adjacent tracks included in the equalization signal output from the multi-input adaptive equalization section;

a binarization section configured to obtain binary data by performing a binarization process on the equalization signal that has passed through the whitening filter;

an equalization error computation section configured to find an equalization error relative to an equalization target for the equalization signal output from the multi-input adaptive equalization section and supply the equalization error to the plurality of adaptive equalizers as a control signal for adaptive equalization;

a whitening factor updating section configured to adaptively update a filter factor of the whitening filter; and a demodulation section configured to demodulate playback data from the binary data obtained by the binarization section.

7. A data detection method of a data detection device to which a plurality of detection signals generated by using photoreceptor signals of a plurality of divided areas of an optical detection section are input for returning light at the time of shining of light onto bounds including a target track subject to data detection and adjacent tracks of an optical recording medium having a plurality of tracks formed thereon, the data detection method comprising:

a multi-input adaptive equalization process of inputting each of the plurality of detection signals to one of a plurality of adaptive equalizers and computing outputs of the plurality of adaptive equalizers thereby to obtain an equalization signal;

a whitening process of whitening crosstalk noise from the adjacent tracks included in the equalization signal obtained by the multi-input adaptive equalization process;

a binarization process of detecting binary data from the equalization signal subjected to the whitening process;

an equalization error computation process of finding an equalization error relative to an equalization target for the equalization signal obtained by the multi-input adaptive equalization process and supplying the equalization error to the plurality of adaptive equalizers as a control signal for adaptive equalization; and a whitening factor updating process of adaptively updating a filter factor of the whitening process.

* * * * *